United States Patent [19]
Garrot, Jr. et al.

[11] Patent Number: 5,878,356
[45] Date of Patent: Mar. 2, 1999

[54] AIRCRAFT BASED INFRARED MAPPING SYSTEM FOR EARTH BASED RESOURCES

[75] Inventors: Donald Jerome Garrot, Jr., Tucson; Stephen Nutter Pitcher, Gilbert, both of Ariz.

[73] Assignee: Agrometrics, Inc., Tucson, Ariz.

[21] Appl. No.: 490,341

[22] Filed: Jun. 14, 1995

[51] Int. Cl.⁶ .......................... G06F 165/00; H04N 5/33
[52] U.S. Cl. .................... 701/1; 701/4; 348/144
[58] Field of Search .............. 364/424.01, 424.02, 364/434, 424.06, 459, 460, 449, 551.01; 701/10, 13, 1, 23, 4, 14, 226, 300; 348/143, 144, 147; 342/357, 25, 26; 382/312

[56] References Cited

U.S. PATENT DOCUMENTS

| | | | |
|---|---|---|---|
| 4,802,757 | 2/1989 | Pleitner et al. | 364/456 |
| 5,045,937 | 9/1991 | Myrick | 348/144 |
| 5,072,396 | 12/1991 | Fitzpatrick et al. | 364/450 |
| 5,187,754 | 2/1993 | Currin et al. | 382/284 |
| 5,198,819 | 3/1993 | Susnjara | 342/26 |
| 5,202,690 | 4/1993 | Frederick | 342/26 |
| 5,247,356 | 9/1993 | Ciampa | 348/144 |
| 5,317,394 | 5/1994 | Hale et al. | 348/208 |
| 5,381,338 | 1/1995 | Wysocki et al. | 364/449.1 |
| 5,457,634 | 10/1995 | Chakravarty | 364/444 |
| 5,485,384 | 1/1996 | Falconnet | 364/449.1 |
| 5,546,309 | 8/1996 | Johnson et al. | 364/434 |
| 5,604,534 | 2/1997 | Hedges et al. | 348/144 |
| 5,625,409 | 4/1997 | Rosier et al. | 348/117 |
| 5,649,032 | 7/1997 | Burt et al. | 382/284 |

*Primary Examiner*—Tan Q. Nguyen
*Attorney, Agent, or Firm*—Benman & Collins

[57] ABSTRACT

An aircraft based imaging system comprising a sensor mounted in the aircraft in a known orientation, circuitry for acquiring signals generated by the sensor from a scanned area, a system for georeferencing the acquired signals; and a system for compensating for tilt in the acquired signals. The sensor is an infrared sensor and the system for georeferencing the acquired signals is a receiver adapted to receive signals from a global positioning system. The system for compensating for tilt in the aircraft includes a gyroscope, a magnetometer and software for controlling the gyroscope to produce signals indicative of the orientation of the aircraft. The software compensates for tilt in the acquired signals and uses the GPS signals to create an accurate mosaic of the images generated by the sensor.

6 Claims, 14 Drawing Sheets

Main Screen in AP3

Selecting Change Directories from Main Screen

Changing Directories

Selecting Preprocessing Menu

AP3 PREPROCESSING
FLOW CHART

PREPROCESSOR OPTIONS SHOWING
MAGNETOMETER OFFSETS

AIRCRAFT BASED INFRARED MAPPING SYSTEM FOR EARTH BASED RESOURCES

BACKGROUND OF THE INVENTION

1. Field of the Invention

The present invention relates to imaging systems. More specifically, the present invention relates to systems for mapping earth based resources using infrared radiometric sensors.

2. Description of the Related Art

Earth resource management is critical for optimal agricultural and other applications. In agricultural applications, earth resource management involves, by way of example, the timed application of controlled amounts of water, fertilizer, pesticides and other elements. In this area, both subjective knowledge and objective data are now amassed in computer-based programs allowing human interaction and providing machine interpretation. These new mechanisms represent a vast improvement over past methods for processing data. The major benefit to agriculture has been the objective integration of knowledge into traditional agricultural practices. Decision support services (DSS) and Expert Systems (ES) have been developed to focus resources in areas of most need where payoff potential is greatest. Included within this range of capabilities are such areas as: nutrient management, insecticide management, crop growth management, soil erosion management, resource management and irrigation management.

There is an ongoing need in the art for optimal management in each of these areas. This requires manual or automatic sensing of one or more indicators. For such applications, thermal sensing techniques are very useful inasmuch as, with respect to crop temperatures, thermal sensing provides an indication of the temperature of the plant which provides an early indication of numerous parameters including proper irrigation level, the presence of parasites and on. Conventional sensing approaches include: 1) soil moisture measurement techniques, 2) plant sampling techniques, 3) atmospheric measurement techniques, and 4) remote sensing techniques.

There are numerous soil moisture measurement techniques including: gravametric sampling, soil tension, soil salinity content, neutron moisture meters, time domain refractometers, and etc. In addition, soil and plant may be sampled manually by feel.

There are numerous experimental and theoretical studies addressing the use of surface temperature and reflectance to gain information about a variety of plant and soil properties. Crop and soil reflectance has been related to green biomass and leaf area index, crop phenology, absorbed photosynthetically active radiation, plant carbon storage and light use efficiency and long term fluxes of nutrients and carbon between various components of the ecosystem. Research using high resolution spectrometers has focused attention on several fertile areas for potential improvements in our ability to detect plant response to stress. One such phenomenon is a shift in the "red edge" of plant reflectance spectra. When plants are stressed, there is a change in concentration of chlorophyll pigments and the red edge moves towards shorter wavelengths (Gates et al., 1965; Horler et al., 1983). This is most noticeable in an examination of the first derivative of spectral response (Demetriades-Shah and Steven, 1988; Demetriades-Shah et al., 1990). There is some expectation that red shift behavior will be independent of the amount of background soil viewed by the radiometer, thus removing a significant obstacle to the interpretation of remotely sensed imagery (Schutt et al., 1984).

Surface temperature has been related to soil moisture content (Jackson et al., 1977b; Jackson, 1982), plant water stress (Jackson et al., 1977a, Idso et al., 1978; Idso, 1982 and Jackson and Pinter, 1981), and plant transpiration rate (Idso et al., 1977b; Jackson et al., 1983). The Idso-Jackson crop water stress index (CWSI), derived from measurements of foliage temperature (Idso et al., 1981; Jackson et al., 1981), has been shown to be closely correlated with soil moisture content, soil water matrix potential, soil salinity, soil waterlogging, plant water potential, leaf diffusion resistance and photosynthesis, as well as final crop yield (see historical reviews by Jackson, 1987 and Idso et al., 1986). These research results led to the use of CWSI for such important farm applications as irrigation scheduling, predicting crop yields and detecting certain plant diseases (Jackson et al., 1977a; Idso et al., 1977a, Reginato et al., 1978; Jackson et al., 1980, Pinter et al., 1979).

Combining surface reflectance and temperature with meteorological data, methods have been developed to estimate evaporation (ET) rates over large areas (Carison et al., 1981; Gurney and Hall, 1983; Price, 1980, 1982, 1990; Running et al., 1989; Soer, 1980; Taconet et al., 1986; Jackson, 1985; Moran and Jackson, 1991). This technique has been successfully applied to mature agricultural fields using ground-, aircraft- and space-based sensors (Reginato et al., 1985; Jackson et al., 1987; Moran et al.,1990b; Moran et al., 1994a) and, with some refinements, to an arid rangeland site (Kustas et al.,1989; Moran et al., 1994c). A method for incorporating remotely sensed spectral and thermal data into simulation models of crop growth and ET has been described (Maas et al., 1985, 1989). Applied to a region, such models, based on infrequent remotely sensed observations, may provide a continuous description of ET over time (Maas et al., 1992; Moran et al., 1992b).

Unfortunately, soil moisture measurement systems are often require wires, tubing and/or special expertise for setup, calibration, operation and maintenance. Plant sampling is often destructive to the crop. Hence, these systems tend to be labor intensive and expensive. More importantly, plant sampling and soil moisture measurement techniques are point source measurement techniques. These systems provide a specific plant or, at best, conditions in the region of a sample. Accordingly, the accuracy of these systems is limited to the extent to which a region is adequately sampled. On the other hand, as the number of samples are increased, the cost increases accordingly.

Atmospheric measurements techniques involve a calculation of water demand based on regional atmospheric conditions. However, this technique is indirect and therefore somewhat inaccurate. The required weather stations are expensive to setup and maintain and the sampling is somewhat localized as is the case with soil moisture measurement and plant sampling techniques discussed above.

At least three thermal remote sensing techniques are known in the art: satellite based systems, aircraft based systems and hand held systems.

The use of satellite data for evaluating temporal changes in surface conditions requires that the data be corrected for atmospheric influences. For visible and near-infrared (IR) wavelengths, this can be accomplished by measuring atmospheric optical depth and using a radiative transfer code to compute the relationship between surface reflectance and radiance at the sensor (Holm et al., 1989; Moran et al., 1990a). However, this procedure is too expensive and time consuming to be used on an operational basis. Other atmospheric correction procedures have been proposed (Otterman and Fraser, 1976; Singh, 1988; Dozier and Frew, 1981; Teillet, 1986), but few have been validated with ground data under different atmospheric conditions and most are dependent upon the use of a radiative transfer model. Ahern et al. (1977) proposed an image-based method for atmospheric correction that eliminated the need for on-site measurements of atmospheric conditions, termed the dark-object subtraction method. Moran et al. (1992a) examined several correction procedures, including four radiative transfer codes (RTC), dark-object subtraction (DOS) and a modified DOS approach, to determine which technique could provide both ease and accuracy. A modified DOS approach, which combined the image-based nature of DOS with the precision of the RTC, provided sufficient accuracy and simplicity to warrant further development.

Image data acquired by satellite and aircraft sensors are usually view angle dependent as a result of a combination of atmospheric effects and the bi-directional surface reflectance of non-lambertian targets (Holben and Fraser, 1984; Staenz et al., 1981). The view-angle effect due to the non-lambertian character of natural surfaces can be removed if the bi-directional reflectance distribution function (BRDF) of each target type is known and a suitable correction algorithm is implemented. Most research has focused on empirical interpretation of bi-directional measurements made using airborne radiometers (Salmonson and Marlatt, 1968, 1971), for vegetation components (Breece and Holmes, 1971; Moran et al., 1989) and canopies (Pinter et al., 1985, 1990; Deering, 1988; Kimes et al., 1985; Shibayama and Wiegrand, 1985; Kriebel, 1978), as well as bare soil and other non-vegetated surfaces (Jackson et al., 1990; Doering et al., 1989; Deering and Leone, 1986; Walthall et al., 1985; Becker et al., 1985; Kimeset al., 1984; Kimes, 1983a). More recently, extensive modeling studies have also been undertaken (e.g., Pinty et al., 1989; Goel and Reynolds, 1989; Ross and Marshak, 1988; Gerstl, 1988; Cierniewski, 1987; Gerstl and Simmer, 1986; Kimes et al., 1986; Kirchner et al., 1981; Egbert, 1977). Using these canopy BRDF models, it has been possible to develop operational methods for normalizing differences in spectral response (Cabot et al., 1994; Qi et al., 1994) and to investigate bi-directional measurements as a source of information about crop stress and structure (Cabot et al., 1994; Qi et al., 1994). Qi et al. (in press) found that by combining outputs from several BRDF models, they could retrieve such crop and plant parameters as leaf area index (LAI), leaf reflectance (p) and leaf transmittance (r). Unlike a simple vegetation index (such as NDVI), this information provides the farmers with meaningful measures of crop growth and stress. Knowledge of LAI, p and r are not only useful as direct measures of crop status but are the basic inputs to crop growth and yield models.

Few concerted efforts to use remotely sensed information in crop growth models have been made. In an early attempt by Arkin et al. (1977), it was recognized that values of model variables could be updated with observed values based on spectral measurements. They proposed the concept of a hybrid "spectral-physiological" model capable of using satellite spectral data. Since then, spectral estimates of leaf area index (LAI), soil moisture, plant green biomass, plant stress and surface evapotranspiration have been incorporated into plant growth and yield models for wheat, cotton, corn, soybeans, sunflower, sorghum, and rangeland vegetation (Hodges and Kanemasu, 1977; Kanemasu et al., 1985; Wanjura and Hatfield, 1985; Asrar et al., 1985; Maas et al., 1985, 1989, 1992; Delecolle and Guerif, 1988; Maas 1988a, 1988b, 1992). Maas (1993a; 1993b) described a method for within-season simulation calibration based on remotely-sensed observations of crop growth obtained during the growing season. This work offers a simple approach to modeling crop growth and yield which requires less ground information by supplementing the model with periodic estimates of key input parameters using remote sensing.

In any event, there are numerous shortcomings associated with conventional remote sensing techniques. Hand held units require considerable expertise, are labor intensive and generate highly localized samples.

Satellite based remote sensing systems have several shortcomings. The data is not delivered in a timely basis. Satellite sensing requires expensive, labor intensive work stations to download the data. The reliability of the data is dependent on atmospheric conditions at the time the area is scanned in that cloud cover can severely attenuate the sensed signals. Further, the resolution of the system is typically fixed and not easily changed. Remote sensing systems used in agriculture do not have the spatial resolution to distinguish plants from soil. This is especially true concerning row crops. Therefore, the need exists to develop and perform extensive modeling to correct the deficiency as required. Additionally, satellites cannot physically sample the ambient air in the atmosphere, further adding to the dynamic modeling requirements and complexity. Finally, the images created are not typically georeferenced nor corrected for tilt. Failure to accurately reference the images to the ground and to correct for a tilt in the sensor make it difficult if not impossible to accurately combine images from individual scans to create a composite map or mosaic generally considered to be useful for agricultural, fire fighting and other earth based resource management applications.

Conventional aircraft based infrared imaging systems have a limited mapping capability. These systems typically look at a single square mile area at one time. The images taken are not georeferenced or corrected for tilt. Accordingly, conventional aircraft based infrared imaging systems do not generate large accurate maps at a high level of resolution on a repeatable basis. This affects the flight height of the aircraft in that the craft must fly at a height at which it can acquire the target area within the field of view of the sensor. Unfortunately, the height at which this can be achieved typically forces a compromise in the resolution of the detected image. Inadequate image resolution limits the extent to which the crop may be distinguished from its background. This, in turn, limits the extent to which crop water stress management may be performed. Finally, the inability to mosaic images delays the delivery of data due to the time required for image processing and assembly; and delivery to the client on a timely basis (within 24 to 36 hours) is usually not possible on a repeatable basis.

Hence, there is a need in the art for an accurate and inexpensive system and technique for IR mapping of large areas at high resolution on a repeatable basis in a timely manner.

SUMMARY OF THE INVENTION

The need in the art is addressed by the invention aircraft based imaging system of the present. The inventive system includes a sensor mounted in the aircraft in a known orientation, circuitry for acquiring signals generated by the sensor from a scanned area, a system for georeferencing the acquired signals; and a system for compensating for tilt in the acquired signals.

In a specific embodiment the sensor is an infrared sensor and the system for georeferencing the acquired signals is a receiver adapted to receive signals from a global positioning system. In the specific embodiment, the means for compensating for tilt in the aircraft includes a vertical gyroscope, a magnetometer and software for controlling the gyroscope by a dedicated processor to produce signals indicative of the orientation of the aircraft. The software compensates for tilt in the acquired signals and uses the GPS signals, vertical gyroscope, magnetometer, and imaging constants to create an accurate mosaic of the images generated by the sensor.

The present invention enables a client to monitor the condition of agriculture, forestry, and man-made activities in real-time or near real-time at substantially lower costs than available satellite imagery. This facilitates the optimal timing of the application of critical resources such as may be required for irrigation management by way of example. The resulting image resolution is usually an order of magnitude greater than most spacecraft remote sensing platforms. Successive overflights can be made and target information can be compared temporally. Polygons representing geographic areas of interest can be laid onto the imagery and statistical analysis performed to quantify changes. This permits accurate analysis and monitoring of selected sites over time, such as irrigation cycles, crop growth, reforestation and revegetation activity. The inventive system may also be used as an effective tool for fire fighting applications.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention provides an airborne remote sensing system that collects real-time digital imagery and relevant georeference information using Global Positioning System (GPS), magnetic, and inertial data from onboard instruments to rapidly create high resolution mosaicked images. The images are automatically tilt-corrected, georeferenced and are Geographical Information System (GIS) ready. Digital Elevation Maps (DEM) are used during the mosaicking process if available to produce ortho-like images (conformed to terrain and tilt-corrected). Thousands of images can be mosaicked in a few hours. In the illustrative embodiment, processing takes place after the flight, but the system can be adapted for real-time processing during the flight. The inventive system can provide the images in a number of formats and/or color hard copy.

Figure 1:
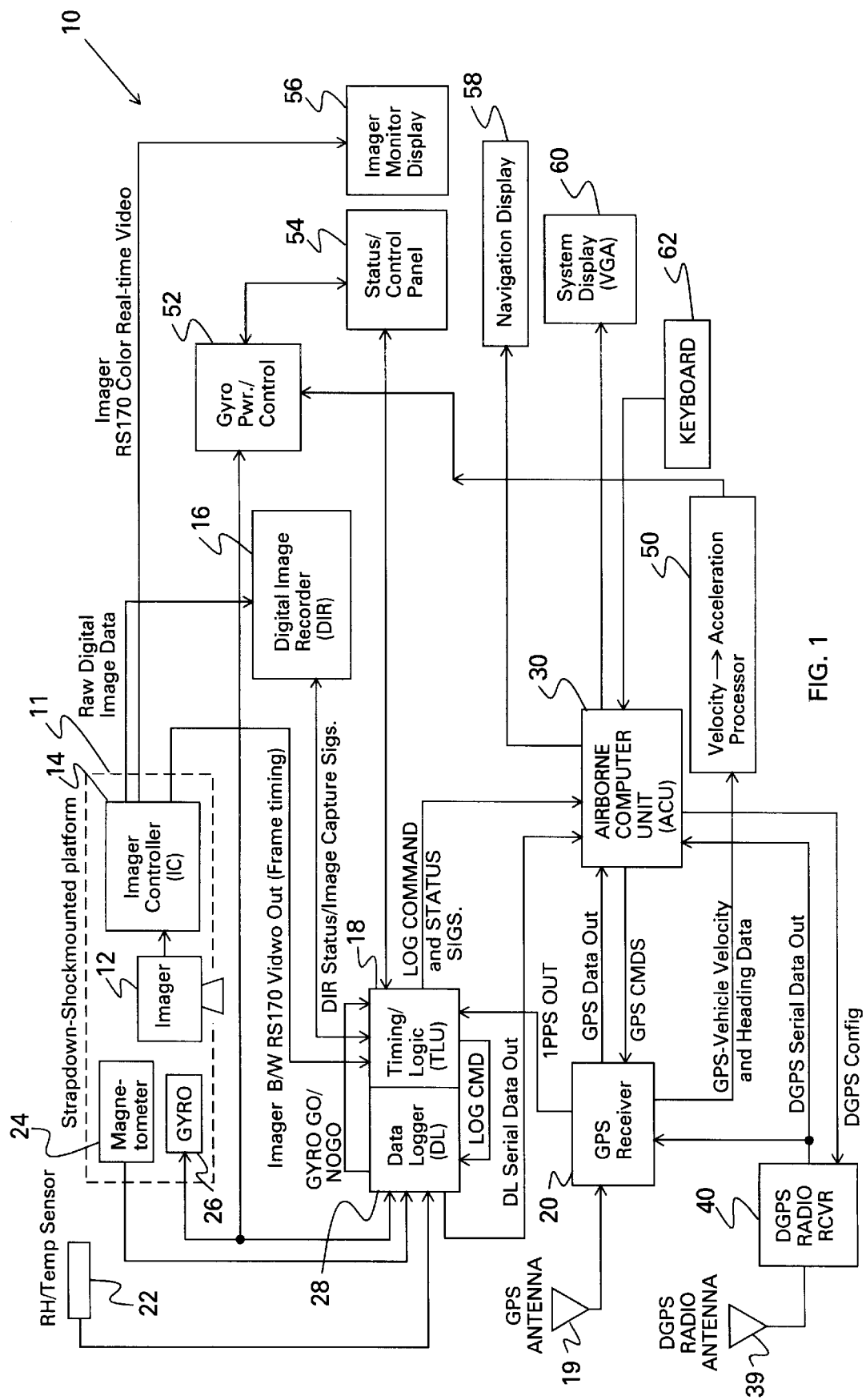
FIG. 1 is a block diagram of the imaging system of the present invention.

FIG. 1 is a block diagram of the imaging system 10 of the present invention. The inventive imaging system 10 collects and stores the necessary image, environmental, GPS, magnetic, inertial and timing data required to enable the Post Processing Program (described below) to produce high resolution, georeferenced imagery. The imaging system 10 is located on an aircraft or other airborne vehicle (not shown). In the illustrative embodiment, the system includes an infrared imager 12. Nonetheless, the teachings of the present invention may be applied to other types of imagers without departing from the scope thereof. The imager 12 is mounted on an image platform (IP) 11 within the aircraft such that the imager 12 is looking down at the target area. As the aircraft flies over a target area, the system 10 acquires discrete digital images that, in accordance with the present teachings, are subsequently mosaicked to produce the desired output image. As the aircraft flies a prescribed grid pattern to collect imagery representing the entire target area, the imager 12 acquires long wave radiographic infrared digital images. In addition, the imaging system 10 provides real-time navigation and system status information to the pilot and flight technician. A Global Positioning System (GPS) receiver 20 outputs precision position, velocity, and timing information. A vertical gyroscope (gyro) 26 and magnetometer 24 which are hard mounted to the IP provide the imaging platform's pitch, roll, and heading data. Control of the vertical gyro 26 is aided by velocity and heading information from the GPS receiver 20 directed to a dedicated processor 50. The processor 50 calculates a smoothed acceleration and controls the erection mechanism of the gyro 26, yielding more accurate pitch and roll data. This information combined with the GPS data provides real-time georeferencing information which is logged during the flight session.

In operation, the imaging system 10 collects digital imagery at specified intervals depending upon the flight altitude and aircraft speed. Imagery is collected within the flight zone, and is automatically disabled when outside of the flight zone or in a turn. An Airborne Computer Unit (ACU) 30 produces an image strobe command. This command is received by a Timing and Logic Unit (TLU) 18 and a corresponding signal is sent to a Digital Image Recorder (DIR) 16 just before the desired image frame. Digital image frames are constantly streaming into the DIR 16 from an Imager Controller Unit (ICU) 14 associated with the imager 12. This signal is optionally inhibited during a no-go condition (such as in a turn) produced by the continuous monitoring of the GPS Receiver 20 by the dedicated processor 50. The DIR responds by signaling the TLU that it is ready to record the next incoming digital image frame. The TLU monitors the analog video output from the imager which is synchronized to the digital image data, and extracts timing pulses from the video signal. The TLU sends a logger strobe pulse to a Data Logger Unit (DLU) 28 and to the ACU precisely in the middle of the next frame. The ACU time tags the logger strobe pulse, which is used to interpolate a position and altitude corresponding to the image capture event. The DLU receives the pulse and immediately samples the gyro 26, magnetometer 24, and RH/Temperature sensors 22 and outputs this information via serial link to the ACU where it is time-stamped and logged to disk. Meanwhile, the DIR logs the desired image to its separate disk via a locally time tagged image file. The RH/Temperature sensors 22 serve to measure canopy air temperature differential and acquire relative humidity (RH) to calculate Vapor Pressure Defficit over the crop area.

The system 10 includes the following functional subgroups. These groups are:

Airborne Computer Subsystem

GPS/DGPS Receivers

Data Logger and Timing/Logic Units

Digital Image Recorder

Imaging Platform

Power Subsystem

Each of these elements is described more fully below.

Airborne Computer Unit:

The ACU 30 determines vehicle position at a 2 Hz rate by processing raw GPS data that is output from the GPS receiver 20. The system can optionally use the GPS receiver's own position computation versus raw GPS measurement data. Differential corrections received by a DGPS receiver 39 are used in the GPS computations to derive precision position solutions. (A DGPS receiver is a digital radio receiver that receives the differential correction broadcasts from a GPS base station, required when correcting the effects of Selective Availability) Differential corrections are produced and broadcast by a GPS land-based base station or via geostationary satellite.

The function of the Airborne Computer Unit (ACU) is to effect centralized control of GPS timing and position data, log serial data (data logger and other sensors) and discrete event inputs, issue imaging strobe commands, facilitate aircraft navigation, and provide a real-time status of the above functions. In the illustrative embodiment, the ACU 30 is implemented with a custom built industrial personal computer configuration. It contains multiple hardware cards that operate on an Industry Standard Architecture (ISA) passive backplane and contains a flat panel display and keyboard. The ACU consists of an enclosure, passive backplane ISA bus, power supply, CPU card, Novatel 951r GPS card, flat panel controller card, 4 channel advanced serial I/O card, floppy drive and a hard disk drive. A keyboard 62, flat panel display 60, and navigation indicator 58 are connected to the ACU.

Software for real-time logging of data (GPS and datalogger, sensors) and pilot navigation is called HPC and is provided by Nortech Inc. of Canada. The HPC software program calculates vehicle position and establishes a precise time standard for the logging events (+/−200 nanoseconds). The HPC product interfaces the GPS receiver 20 and external serial data and timing signals to the ACU 30 which provides disk logging and vessel navigation.

GPS Receiver:

The GPS receiver 20 located in the aircraft decodes positioning signals that are broadcast on the L1 band by the Department of Defense Navstar Global Positioning System network of satellites and received by GPS antenna 19. In the illustrative embodiment, the GPS receiver is a Novatel 951r that outputs raw measurement data to the ACU 30. The GPS receiver also outputs a 1 Pulse Per Second (PPS) logic signal which provides a precise timing standard to the ACU. Currently, the ACU computes a GPS solution (position and velocity of the aircraft) from the raw measurement data received from the GPS receiver. The GPS receiver is also capable of computing its own position and velocity data and sending it to the ACU.

The Navstar GPS network's raw ranging and time signals are intentionally degraded for civilian users (L1 band), and as a result a Differential GPS correction (DGPS) must be utilized for accurate position and velocity computations. These corrections are logged at a base station and broadcast to the aircraft. The DGPS transmitter and receiver pair (transmitter on the ground, receiver in the aircraft) are model # RDDR96 made by Pacific Crest Corp.. The DGPS radio receiver 40 and receiver antenna 39 is located on the aircraft. Transmission is currently on the 456.5 Mhz UHF band.

Vehicle acceleration is calculated by the dedicated processor 50 for the purpose of controlling the erection mechanism of the vertical gyro 26. As mentioned above, the vertical gyro 26 resides on the imaging platform 11 and produces pitch and roll data needed for an accurate projection of each logged image frame. The processor 50 consists of an embedded computer that receives GPS velocity, heading, time, and solution status information from the GPS receiver 20 at a 5 Hertz rate via a serial data link. The processor 50 controls the vertical gyroscope's 26 erection mechanism.

Figure 1A:
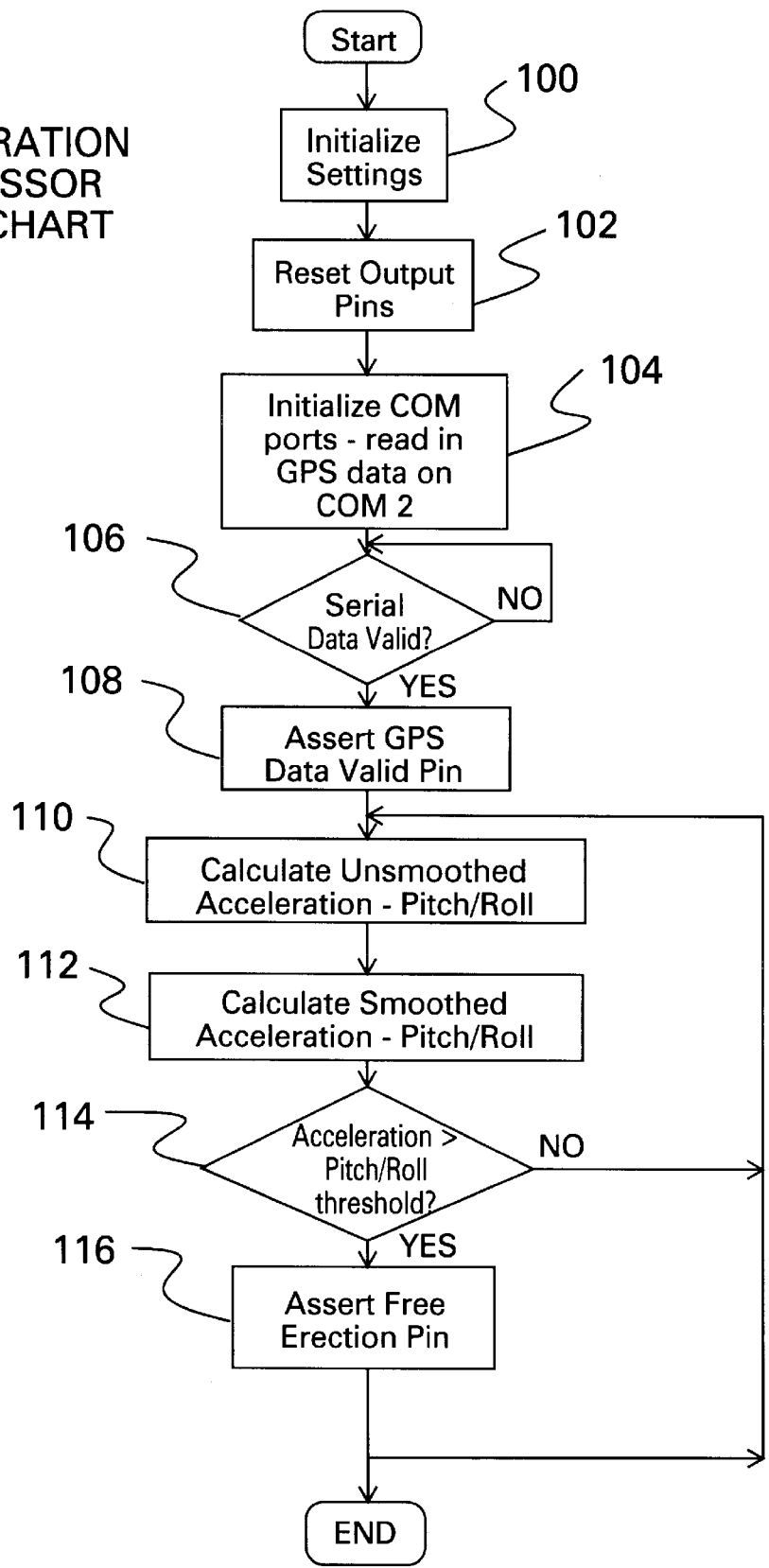
FIG. 1A is a flow diagram of an illustrative implementation of software running on the acceleration processor.

FIG. 1A is a flow diagram of an illustrative implementation of software running on the acceleration processor. As shown in FIG. 1A, upon initial power-up, the processor reads in a configuration file, initializes all internal settings 100, the GPS data communications (COM) port 104, and resets the output pins 102. The output pins control the vertical gyroscope 26 and a status light that indicates the GPS solution status bit condition. When the GPS receiver 20 indicates that satellite tracking is occurring such that reliable GPS data is produced, the input serial data is assumed to be valid 106 and the GPS Data Valid pin 108 is asserted. Instantaneous Normal (roll) and axial (pitch) accelerations 110 are calculated and a second order digital filter 112 at a cut-off frequency of 0.5 Hz. is applied to each axis, and compared to an acceleration threshold 114 by processor 50. When the value in either axis is exceeded, the gyro is commanded to a free inertial state 116, otherwise the normal erection mechanism is active. Greatly smoothed pitch and roll data are produced because less of the vehicle accelerations influence the vertical gyro readings facilitating better image quality than is possible with an un-aided vertical gyro. The vertical gyro 26 contains an erection system that slowly seeks the gravity vector. The gravity vector is influenced by instantaneous and sustained accelerations. The gyro's pitch and roll readings will contain erroneous values if these accelerations are allowed to accumulate. The purpose of the processor 50 is to minimize the accelerations that can influence the vertical gyro by temporarily commanding the gyro into a free erection state (insensitive to any accelerations) during a GPS measured acceleration period which exceeds the predefined threshold. This cycle will repeat itself many times during a flight.

Data Logger and Timing/Logic Units:

The DLU 28 logs the Imaging Platform's pitch and roll, magnetometer (to calculate aircraft heading), external temperature and external humidity (used to help determine the growing plants' water stress status), and event status inputs. The DLU consists of a single board computer manufactured by Octagon Systems, model #6012 with a custom designed signal conditioning and go/no-go logic board. Pitch, roll, temperature, and humidity are logged via the DLU analog inputs. The magnetometer data is read into the DLU via the COM2 serial port. The DLU contains a calibration table which converts the analog inputs into engineering units that is output with the other logged data. The DLU continuously looks for a logger strobe input which originates from the ACU 30 via the Timing/Logic Unit 18. When the strobe input logic signal is received, the logger polls the analog inputs and reads the magnetometer 24 serial data input. This data along with the event status input (which defines the event type . . . imaging, initialization, or meteorology event) is formatted in a defined data frame structure and outputted to the ACU via a RS-232 serial connection where it is time tagged and logged. The DLU can be strobed at a maximum rate of two times per second and is housed inside of the TLU enclosure.

The Timing/Logic Unit (TLU) 18 provides system timing, logic and buffering circuitry. The real-time analog video from the imager controller (IC) 14 is fed into a video logic decoder IC (located inside the TLU) where the video frame timing signals are decoded and input into Programmable Array Logic devices (PALs) (not shown). The video timing signals correspond precisely with the imager's 12 digital image data. This enables the TLU to precisely issue commands and to time tag events at the desired moment in the digital frame that is captured. The DLU is strobed by the TLU in the middle of the image frame that is to be captured, at the frame's odd to even field transition. The PALs contains logic which controls the issuance of the capture command, status outputs, and monitors the state of various status inputs. The PALs makes sure that the system operates within the desired logic parameters.

The TCU contains buffering circuits which convert RS-232 +/−12 V inputs to TTL discrete signal levels, and vice versa. This permits the logic to interface correctly with the RS-232 ports in the ACU. These include such signals as the 1PPS input from the GPS receiver 20, logger strobe command, and frame log command (to/from the DIR 16).

A status and control panel 54 is connected to the TCU, which displays the strobe input, logger strobe event, and the Digital Image Recorder's frame logged acknowledgment. Also, a go/no-go status signal (go/no-go originates from the gyro output), and Uninterruptible Power Supply status is displayed. A toggle switch (not shown) controls the issuance the image strobe event, and another switch defines the image override mode. The image override mode when enabled, will allow the system to ignore the go/no-go status inputs and acquire the image every time an image strobe event is issued. In the normal mode, the image event is not allowed as long as the no-go condition is active.

Digital Image Recorder:

The Digital Image Recorder (DIR) 16 monitors continuous digital image frame data from the IC 14 and logs the desired frame when commanded by the TLU 18. In the illustrative embodiment, the DIR is a product that is sold by Inframetrics, the manufacturer of the infrared imager 12. It consists of a 486 industrial PC with a SCSI hard drive and a proprietary digital interface card. Control software in the DIR may be modified to allow remote command and monitoring of the imaging process. The DIR receives commands from the TLU and logs the desired image frames to its hard drive. Each image is logged separately in a TIFF file format.

The DIR is commanded and monitored via a serial interface with the TLU. Digital image data is constantly being buffered into the DIR to an on-board first-in, first out (FIFO) buffer (not shown). If no image capture commands are received, the images are simply replaced by more recent images coming in.

Figure 2:
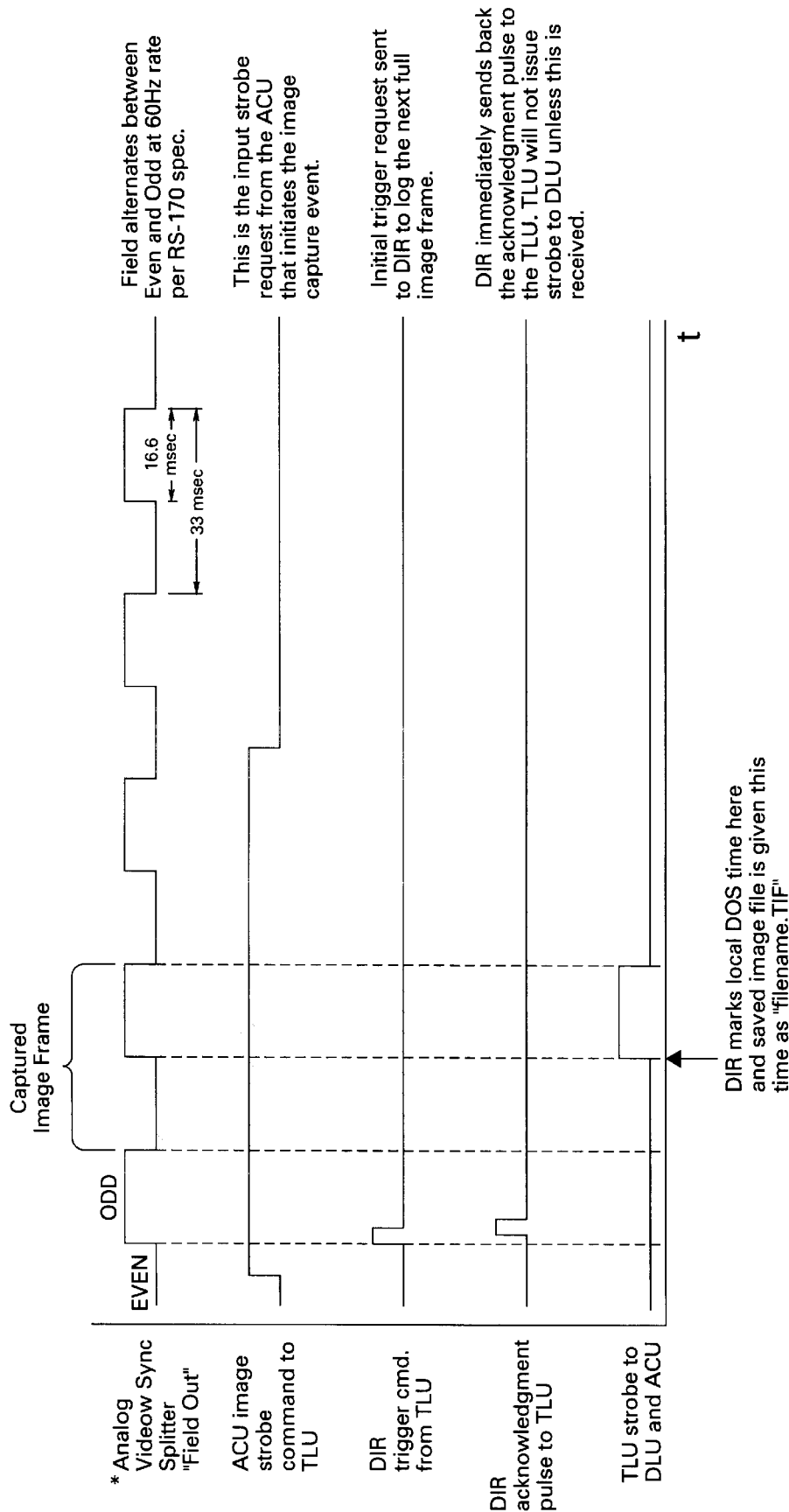
FIG. 2 is a timing diagram depicting the image capture event.

FIG. 2 is a timing diagram depicting the image capture event. As depicted in FIG. 2, the TLU sends an image strobe pulse during the even field of the frame preceding the frame to be captured. The DIR sends back an acknowledgment pulse immediately to the TLU (this acknowledges that the DIR is active and allows the TLU to continue with the image strobe logic sequence. If no acknowledgment pulse is received, then the TLU will issue an Image Fault status output which will be displayed on the status and control panel. The DIR waits for the next frame (defined by the even to odd field transition . . . RS-170 specification) and tags it with its local DOS time corresponding to the middle of the desired frame that is logged. At this same moment (the middle of the desired image frame) the TLU issues a logger strobe pulse to the DLU and a simultaneous pulse to the ACU. Finally, the DIR issues a frame-logged acknowledgment pulse to the TLU which is displayed on the status and control panel 54. This signal is also sent to the ACU to define the time that the frame was logged to disk. Imaging Platform:

The Imaging Platform (IC) 11 contains the imager 12, gyro 26, magnetometer 24, and imager controller 14. The IC is a rigid platform that is mounted to the aircraft via vibration isolated mounts. The gyro and magnetometer are rigidly attached to the platform, as is the imager. Any relative motion (pitch, roll, yaw) that the imager experiences, will also be sensed by the gyro and magnetometer. In the preferred embodiment, the post-processing software tilt-corrects for off-Nadir images (typical in a moving aircraft) rather than utilizing active pitch and roll stabilization i.e. gimballing on the platform. This simplifies the system and lowers cost.

In the preferred embodiment, the imager 12 is a model 760 Digital Infrared Radiometer manufactured by Inframetrics Inc. This imager is a long wavelength (8–12 micrometer) quantitative radiometer which produces analog and digital raster images where each pixel represents absolute temperature of the target. Minimum thermal resolution and detection is 0.1 C°. The element resolution is 1.8 mrad @50% SRF with a 15° Vertical and 20° Horizontal FOV lens. The normal temperature measurement range is −20° to +400 C°. An available extended range (detect and quantify fires) is +20° to +1500 C°. The sensor resolution is 8 bits, and the temperature span can be set within a specific area of interest for maximum thermal resolution. Image frame digital output is 197 lines horizontal and 256 lines vertical. The model 760 imager is composed of two parts; the Imager 12 and the Image Controller 14. The Imager Controller 14 controls the imager 12 and outputs digital image data to the Digital Image Recorder (DIR) 16. The mosaicking process combines the individual frames into a high resolution mosaic. The resulting mosaicked image represents absolute temperature for each of the millions of pixels that are produced. The image resolution ranges from 0.3 meters to greater than 5 meters, and is flight altitude dependent. Typical images contain 5 to 70 million pixels.

In the preferred embodiment, the gyro 26 is a Humphry's Instrument model # VG24-3116-1 vertical gyro. It is mounted directly to the imager housing's mounting bracket. This device contains a 2 axis (pitch, roll) rotating gimbaled gyro element and a vertical erection system that actively seeks the vertical gravity vector. The erection system is disabled during sustained turns and accelerations automatically by the dedicated acceleration processor 50. A control panel 52 provides visual indication of the gyro status and includes override switches that can manually control the gyro.

The magnetometer 24 is a TCM2-16 manufactured by Precision Navigation Inc. which is a solid state device. This device measures the earth's X, Y, and Z magnetic fields relative to the imaging platform. This data is used in conjunction with the vertical gyro's pitch and roll data taken concurrently to derive vehicle heading. This is an important feature, because in the inventive system, heading is essentially immune to vehicle accelerations. Heading values calculated from a magnetic sensing device depend upon accurate vertical inclination (pitch and roll values) at all times. Conventional sensors use an inexpensive on-board inclinometer which is useless on a dynamic platform such as an aircraft. The magnetometer sensor is oriented such that its pitch and roll planes align with the gyro's 26 pitch and roll axes.

Power Subsystem:

The imaging system 10 receives power from the 24 vdc accessory aircraft bus. The system draws approximately 8 amps continuously. A solid state inverter converts the 24 vdc input power to 120 v ac output power that is supplied to all of the computers' internal switching power supplies. An Uninterruptible Power Supply (UPS) protects the system from transient voltage and current spikes and allows uninterruptible operation during the external to internal (aircraft) power transfer. A power supply inside of the Digital Image Recorder (DIR) currently provides dc power to the Data Logger, Timing and Logic Unit, magnetometer, DGPS radio receiver, and the Status and Control Panel. The gyro 26 is powered directly from the aircraft's 24 vdc bus.

Post Processing Software:

The Post Processing Program utilized by the present invention is a windows based software package that was created to facilitate massive and automatic image mosaicking and extraction of flight data. This program is known as AP3. Flight data is produced by the Imaging System 10. The imaging system 10 acquires all of the raw image files, with corresponding flight data. After the flight, GPS post processing and logger/sensor post processing described above are performed prior to running AP3. With few modifications, AP3 can be run in real-time during aircraft flight.

AP3 is a collection of powerful routines integrated into a windows based software package that creates tilt-corrected, resampled, georeferenced digital mosaicked images of the target area. AP3 creates high resolution images which are composed of thousands of standard resolution individual images that are precisely placed to form a single contiguous "mosaic" of the desired target area. The program can use a Digital Elevation Map to conform the imagery to an irregular elevation surface. This is useful in mountainous and uneven terrain. AP3 will resample the images to a common orientation, such as north. This places the output mosaic into an orientation that allows later flights over the same area to be viewed and analyzed within a common reference. When AP3 processes a flight, a configuration file is created which contains all of the necessary constants, offsets, and projection parameters. This file can be easily recalled upon subsequent flights over the same target area, and new mosaics are produced which match the same size and extent of previous imaging flights. This allows rapid image comparison by facilitating subsequent images to be overlaid in layers, viewing changes spatially.

The Post Processing Program (AP3) currently processes raw imaging system flight data into predetermined mosaicked images that are in the Generic Georeferenced Raster (GGR) image format. This file format contains an image header which specifies all the necessary georeferencing and projection parameters for automatic import into a full-featured Geographic Information System (GIS) software program. Currently the system uses a 16-bit raster value which facilitates an absolute temperature to be assigned to each pixel in the image. The mosaicked image typically contains millions of pixels, all of which are georeferenced to an absolute coordinate system. The GIS program known as MIPS (Map and Image Processing Software) is the package used to view and print the mosaics. It is commercially available. While useful, MIPS is considered a peripheral part of the software suite. The real core of the inventive imaging capability resides in the hardware and software systems described herein such as the airborne imaging system and the AP3 software package.

Figure 3:
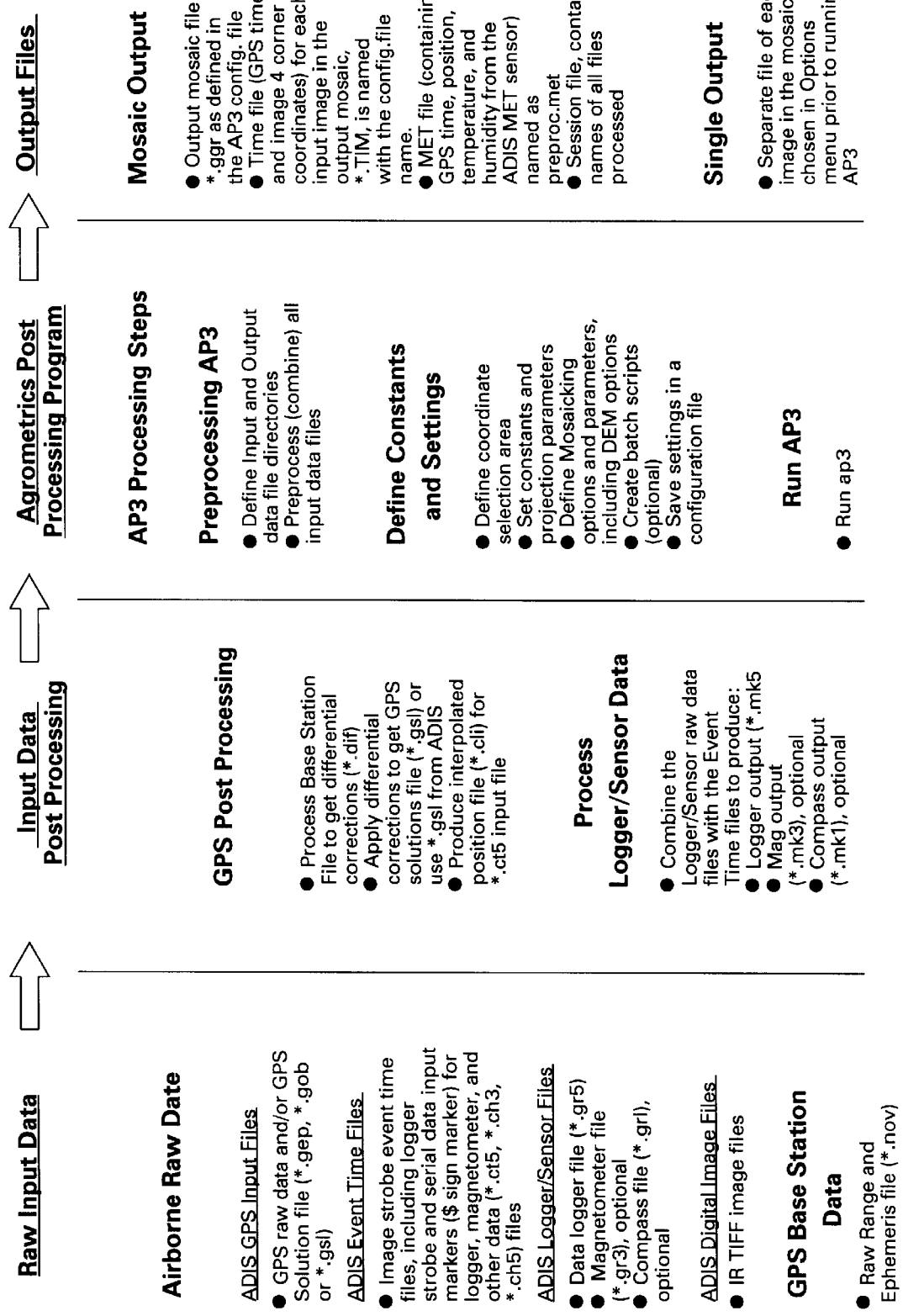
FIG. 3 is a diagram which depicts post-processing data flow.

This section discloses the processing flow used to produce the digital mosaicked images in accordance with the teachings of the present invention. The post flight data processing flow is depicted in FIG. 3. The input data includes image constants and settings, digital imagery, GPS derived aircraft position, datalogger records consisting of aircraft attitude, heading and meteorological data, and optionally the raw input files of a digital magnetometer and compass (for backup purposes to derive heading). Also, a GPS base station that is located at a surveyed site on the ground near the operating area produces a file of raw GPS measurements. This file is used to create differential corrections that are applied to the airborne GPS measurements to produce precision position solutions. Alternatively, differential corrections that are broadcast via the UHF radio to the airborne system can be logged and used in place of the base station file.

Data Processing Description:

This section contains a detailed description of the data processing steps, including input data file format, method of processing, and the output product. The data processing steps as illustrated in FIG. 3 above are broken down into four major categories:

1. Raw Input Data

2. Input Data Post Processing

3. Agrometrics Post Processing Program (AP3)

4. Output Files

After the output mosaics are produced, they are imported into MIPS (the GIS program) where they are colorized, printed and stored. The particular steps that illustrate MIPS processing are not depicted in this document.

Raw Input Data

The input data originates from the imaging system 10 and from a ground-based GPS base station (not shown). Both of these sources contain the digital data on respective computer hard drives. In the case of the airborne system, a removable 1 gigabyte hard drive that contains all of the data files is removed from the imaging system 10 and inserted into the ground processing computer. In the illustrative embodiment, the ground processing computer performs the post-flight processing.

Airborne Raw Data

The imaging system 10 data files are of three types:

1. GPS Input Files
2. Event Time Files
3. Datalogger/Sensor Files
4. Digital Image Files With the exception of item 4 above, the files are produced by software from Northech Inc. known as HPC. This software is running real-time during the flight session in the ACU 30 and logs all of imaging system input events and datalogger/sensor files. It also logs all of the GPS data that is used during the GPS post processing step. It is important to note that HPC is used only for data logging, time and position logging, and pilot guidance. The imaging system 10 was configured independently of Nortech Inc. Item 4 consists of TIFF digital image files produced by the Digital Image Recorder (DIR) 16.

GPS Input Files

These files consist of the GPS raw data files *.GEP and *.GOB which are the Generic Ephemeris and Generic Observation files respectively. The Generic Ephemeris file contains GPS satellite orbital ephemeride data collected during the survey session. The Generic Observation file contains the raw GPS pseudorange, doppler, and carrier phase data for each GPS satellite that was acquired for each solution epoch. A GPS solution file containing real-time GPS position and time solutions logged during the flight is also included. This is the *.GSL known as the Generic SoLution file. This file is a backup in case GPS post processing of the *.GEP and *.GOB files is not successful. These are binary files produced by HPC.

Event Time Files

GPS time stamps of each of the image strobe events is contained in the *.CT5 file where CT5 stands for serial port #5 of ACU 30 on the CT pin. Every time an image is acquired, HPC time stamps it with a GPS time. Also, serial data output from the Data Logger Unit (DLU) 28 is time tagged every time a $ character is encountered and stored in the *.CH5 file. The $ character appears as the first character in the DLU's ASCII serial output every time an image event or meteorological (MET) event occurs. This file is later combined with the Data Logger Unit's serial data output to form a time stamped file which contains logger data and a GPS time for this event. A file containing optional magnetometer or compass data (*.CH3, and *.CH1 respectively) is stored and later processed in the same manner as the DLU's file *.CH5. The ch suffix stands for "character" and the number that follows is the serial port ID known to HPC. All of these are binary files and are produced by the HPC software program.

Logger and Sensor Files

HPC opens a single contiguous file for the entire flight session. Upon landing and transferring the data to the ground processing station, the data is split into its many sub-files. The time-stamp files were mentioned above. All raw serial data produced by the Data Logger Unit, magnetometer or compass, is stored as a contiguous string in the *.GR5, *.GR3, or *.GR1 files respectively. The GR suffix stands for "generic recorder" and the number is the serial port ID known to HPC. The imaging system has up to 5 serial ports.

Digital Image Files

Each individual image produced by the Infrared Imager 12 saved by the Digital Image Recorder (DIR) 16 is stored as a time-tagged TIFF file. Thousands of these files result from a typical flight session. The file name is the DIR's local computer time at the middle of the frame (odd-to-even field transition) that is stored. The file would appear as follows: HHMSSSS.TIF where HH=24 hour military time, MM=minutes, and SSSS=seconds and hundredths of seconds. TIF stands for the TIFF file format. A special section in this file contains proprietary radiographic calibration and other data necessary to convert the TIF file to a 16 bit binary absolute temperature file.

GPS Base Station Data

The GPS base station logs raw range measurements and ephemeris data during the survey flight. The raw range measurements consist of GPS satellite pseudorange, doppler, and carrier phase measurements for each GPS solution epoch. The ephemeris data consists of GPS satellite ephemeride information that describes the orbital parameters and trajectories of the satellites that were tracked. The GPS base station receiver (not shown) located in a ruggedized enclosure produces real-time differential corrections (DGPS) that are uplinked to the imaging system 10. The differential corrections serve to remove the effects of Selective Availability imposed on the L1 band by NAVSTAR. Selective Availability (SA) is an intentional position and time degradation, and must be removed in real-time or in post processing for precision positioning. For post processing, a binary file containing raw range measurements and satellite ephemeris data is logged. This file is *.NOV and is used in GPS post processing to remove the effects of SA on the imaging system's position solutions.

Input Data Post Processing

The next step in the processing flow is to perform:

1. GPS Post Processing

2. Logger and Sensor Data Processing

These steps prepare the airborne data for input into the Agrometrics Post Processing Program (AP3) by applying the base station's differential corrections to remove the SA position degradation, and format the logger and sensor data with GPS time stamps.

GPS Post Processing

All GPS post processing is currently performed using the Nortech Inc. software product HPM. HPM produces differential corrections *.DIF from the raw base station GPS data. HPM then applies these differential corrections to the *.GOB and *.GEP files produced by HPC in the airborne system and creates a *.GSL file. This is the Generic SoLution file. It contains differentially corrected positions and times for every GPS solution epoch during the flight. A GPS solution is produced approximately every 0.5 seconds. The *.GSL file is invoked when a *.CLI file (client file) is produced from the *.CT5 file. The *.CLI file is an ASCII record that contains interpolated (interpolated by GPS time) positions that correspond with each image or MET event that occurred during the flight. A sample *.CLI file is provided below.

| | | | | | | | |
|---|---|---|---|---|---|---|---|
| 142 | 483131633.451 | 3638226.638 | 410452.414 | 403.736 | 0.724 | 0.708 | 1.179 |
| 142 | 483131635.521 | 3638226.651 | 410452.452 | 403.816 | 0.723 | 0.709 | 1.181 |
| 142 | 483131713.690 | 3638227.671 | 410452.930 | 405.441 | 0.963 | 0.952 | 1.575 |
| 142 | 483132243.399 | 3637655.406 | 410242.476 | 407.883 | 0.358 | 0.371 | 0.629 |
| 142 | 483132476.054 | 3638219.667 | 419208.511 | 950.592 | 0.344 | 0.454 | 0.642 |
| 142 | 483132476.855 | 3638219.832 | 419263.250 | 948.786 | 0.342 | 0.452 | 0.638 |
| 142 | 483132478.257 | 3638220.083 | 419359.244 | 945.269 | 0.346 | 0.457 | 0.645 |
| 142 | 483132478.791 | 3638220.056 | 419395.898 | 943.752 | 0.347 | 0.458 | 0.646 |
| 142 | 483132479.826 | 3638220.124 | 419467.086 | 941.329 | 0.348 | 0.460 | 0.649 |
| 142 | 483132481.295 | 3638220.446 | 419568.489 | 938.023 | 0.348 | 0.460 | 0.649 |
| 1 | 2 | 3 | 4 | 5 | 6 | 7 | 8 |

The bold numbers above (1–8) represent the fields of the sample *.CLI output file that is illustrated. From left to right the fields are as follows:

1. record type (142)
2. GPS time in seconds
3. Universal Transverse Mercator Northing (UTM northing) in meters
4. Universal Transverse Mercator Easting (UTM easting) in meters
5. Geoid Height (mean sea level height) in meters
6. UTM Northing Standard Deviation in meters
7. UTM Easting Standard Deviation in meters
8. Geoid Height Standard Deviation in meters The GPS time in record 2 corresponds exactly when the image or MET event occurred.

Logger and Sensor Data Processing

The Data Logger Unit's (DLU) 28 serial data *.GR5 file is combined with its $ character time stamps file *.CH5 to create an ASCII file *.MK5. MK5 stands for "marked" data file from serial port #5 of the ACU 30. In the system 10 of FIG. 1, the Data Logger Unit 28 samples the vertical gyro analog output, the MET sensor's analog output, the Imager's inclinometer's analog output (not shown), digital status inputs/outputs, and the magnetometer 24 serial output. All of the analog inputs are converted to engineering units and this data is output in a formatted structure. A sample *.MK5 file is shown below.

1. Event record number
2. GPS time in seconds when the $ character was detected by HPC
3. Leading $ character
4. Local Data Logger 28 date and time MM-DD/HH:MM:SS.SS
5. Vertical gyro 26 pitch in degrees (nose up positive)
6. Vertical gyro 26 roll in degrees (left wing up positive)
7. Imager 12 pitch in degrees (nose up positive) . . . not shown
8. Imager roll in degrees (left wing up positive) . . . not shown
9. MET 22 temperature in degrees Celsius
10. MET 22 humidity in percent (0–100%)
11. Spare analog input
12. Spare analog input
13. Digital input hex word
14. Digital output hex word
15. Magnetometer 24 X axis measurement in micro tesla's, axial axis
16. Magnetometer 24 Y axis measurement in micro tesla's, normal axis
17. Magnetometer 24 Z axis measurement in micro tesla's, vertical axis
18. Carriage return The magnetometer 24 produces a measurement every ¹⁄₁₆th of a second during the flight. The imaging system 10 allows the user to log this entire output for the complete survey flight, or only log the data for each image event. The

| | | | | | | | | | |
|---|---|---|---|---|---|---|---|---|---|
| 1 | 483131633.62681 | $LOG1, | 04-28/12:18:55.74, | 5.21, | −.77, | .43, | 1.01, | −10.81, | .00, |
| 2 | 483131635.69000 | $LOG1, | 04-28/12:18:57.83, | 5.19, | −1.00, | .43, | 1.02, | −10.81, | .00, |
| 3 | 483131713.85889 | $LOG1, | 04-28/12:20:15.99, | 5.25, | −.72, | .43, | 1.02, | −10.81, | .00, |
| 4 | 483132243.56886 | $LOG1, | 04-28/12:29:05.69, | 8.47, | −.04, | .43, | 1.01, | −10.88, | .00, |
| 5 | 483132476.22275 | $LOG1, | 04-28/12:32:58.36, | −.41, | .68, | .43, | 1.01, | −10.88, | .00, |
| 6 | 483132477.02351 | $LOG1, | 04-28/12:32:59.12, | −.59, | −.51, | .43, | 1.02, | −10.88, | .00, |
| 7 | 483132478.42563 | $LOG1, | 04-28/12:33:00.55, | −.79, | 2.42, | .40 | 1.00, | −10.90, | .03, |
| 8 | 483132478.96034 | $LOG1, | 04-28/12:33:01.10, | −.86, | .71, | .44, | 1.02, | −10.90, | .00, |
| 9 | 483132479.99568 | $LOG1, | 04-28/12:33:02.09, | −.97, | −.04, | .43, | 1.02, | −10.90, | .00, |
| 10 | 483132481.46501 | $LOG1, | 04-28/12:33:03.57, | −1.17, | −2.33, | .42, | 1.00, | −10.88, | .00, |
| 1 | 2 | 3 | 4 | 5 | 6 | 7 | 8 | 9 | 10 |

| | | | | | | | |
|---|---|---|---|---|---|---|---|
| 1 | .06, | .01, | 253, | 0, | X25.32 | Y18.25 | Z0.22 | <CR> |
| 2 | .06, | .01, | 253, | 0, | X26.25 | Y19.30 | Z0.32 | <CR> |
| 3 | .06, | .01, | 251, | 0, | X26.25 | Y19.30 | Z0.32 | <CR> |
| 4 | .06, | .01, | 249, | 0, | X26.28 | Y19.20 | Z0.32 | <CR> |
| 5 | .06, | .01, | 249, | 0, | X26.25 | Y19.30 | Z0.38 | <CR> |
| 6 | .06, | .01, | 249, | 0, | X26.40 | Y19.30 | Z0.32 | <CR> |
| 7 | .06, | .01, | 249, | 0, | X26.25 | Y19.93 | Z0.32 | <CR> |
| 8 | .06, | .01, | 249, | 0, | X26.35 | Y19.30 | Z0.62 | <CR> |
| 9 | .06, | .01, | 249, | 0, | X26.25 | Y19.30 | Z0.32 | <CR> |
| 10 | .06, | .01, | 249, | 0, | X26.25 | Y19.30 | Z0.32 | <CR> |
| 1 | 11 | 12 | 13 | 14 | 15 | 16 | 17 | 18 |

The bold numbers above (1–17) represent the fields of the sample *.MK5 output file that is illustrated. From left to right the fields are as follows:

entire magnetometer file is the *.MK3 file, and is used for magnetometer calibration and as an alternate to the *.MK5 data logger's record of the magnetometer 24. A sample file is shown below.

| 1 | 483131519.95130 | $ | X-6.96 | Y23.79 | Z41.17* | 22 | <CR> | <LF> |
|---|---|---|---|---|---|---|---|---|
| 2 | 483131520.01380 | $ | X-6.95 | Y23.80 | Z41.16* | 2D | <CR> | <LF> |
| 3 | 483131520.07624 | $ | X-6.95 | Y23.80 | Z41.16* | 2C | <CR> | <LF> |
| 4 | 483131520.13921 | $ | X-6.96 | Y23.79 | Z41.18* | 27 | <CR> | <LF> |
| 5 | 483131520.20134 | $ | X-6.96 | Y23.79 | Z41.17* | 23 | <CR> | <LF> |
| 6 | 483131520.26383 | $ | X-6.95 | Y23.80 | Z41.16* | 24 | <CR> | <LF> |
| 7 | 483131520.32634 | $ | X-6.95 | Y23.80 | Z41.16* | 24 | <CR> | <LF> |
| 8 | 483131520.38884 | $ | X-6.94 | Y23.79 | Z41.17* | 22 | <CR> | <LF> |
| 9 | 483131520.45128 | $ | X-6.95 | Y23.79 | Z41.17* | 2F | <CR> | <LF> |
| 10 | 483131520.51383 | $ | X-6.94 | Y23.79 | Z41.16* | 24 | <CR> | <LF> |
| 11 | 483131520.57636 | $ | X-6.96 | Y23.80 | Z41.16* | 24 | <CR> | <LF> |
| 12 | 483131520.63921 | $ | X-6.97 | Y23.78 | Z41.18* | 27 | <CR> | <LF> |
| 13 | 483131520.70133 | $ | X-6.96 | Y23.79 | Z41.17* | 28 | <CR> | <LF> |
| 14 | 483131520.76376 | $ | X-6.96 | Y23.79 | Z41.15* | 2F | <CR> | <LF> |
| 15 | 483131520.82624 | $ | X-6.95 | Y23.79 | Z41.16* | 2A | <CR> | <LF> |
| 16 | 483131520.88887 | $ | x-6.95 | Y23.79 | Z41.17* | 2F | <CR> | <LF> |
| 17 | 483131520.95126 | $ | X-6.96 | Y23.79 | Z41.17* | 27 | <CR> | <LF> |
| 18 | 483131521.01384 | $ | X-6.94 | Y23.79 | Z41.16* | 2C | <CR> | <LF> |
| 19 | 483131521.07623 | $ | X-6.96 | Y23.79 | Z41.17* | 2C | <CR> | <LF> |
| 1 | 2 | 3 | 4 | 5 | 6 | 7 | 8 | 9 |

The bold numbers above (1–9) represent the fields of the sample *.M3 output file that is illustrated. From left to right the fields are as follows:

1. Event record number
2. GPS time in seconds when $ character was detected by HPC
3. $ character used for time tag
4. Magnetometer 24 X axis measurement in micro tesla's, axial axis
5. Magnetometer 24 Y axis measurement in micro tesla's, normal axis
6. Magnetometer 24 Z axis measurement in micro tesla's, vertical axis
7. Asterisk and checksum
8. Carriage return
9. Line feed Post Processing Program (AP3)

This section describes the core software program that produces the output mosaicked images, and other necessary data. Processing flow, theory, and program illustrations are presented.

The Post Processing Program (AP3) currently processes raw imaging system flight data into predetermined mosaicked images that are in the GGR image format. This is a file format known as Generic Georeferenced Raster, and contains an image header which specifies all the necessary georeferencing and projection parameters for automatic import into a full-featured GIS software program. AP3 combines relevant data in the *.CLI, *.MK5, *.MK3 (optional) with the TIF image files to produce the mosaicked images. AP3 uses the GPS time stamps in each data file and the DIR filename time with the TIF images to correlate valid image data with its respective TIF image file. A quality control method is implemented that will search and create a correlated link with the input files even if some of the records are corrupt or missing. This is one of the main tasks that takes place during the preprocessing stage in AP3.

At the heart of AP3 is software written in Borland C++ called Tiltcor2.C. This is the "engine" that performs the resampling, tilt correction, conforming the imagery to a Digital Elevation Map (DEM), mosaicking, mosaicking to a mask, and produces other file outputs as needed.

Overview of AP3 Functions

AP3 operation consists of three major processing steps:
1. Preprocessing
2. Defining a Configuration of Constants and Settings
3. Running AP3

FIGS. 4–8 illustrate the operation of post processing software of the present invention.

Figure 4:
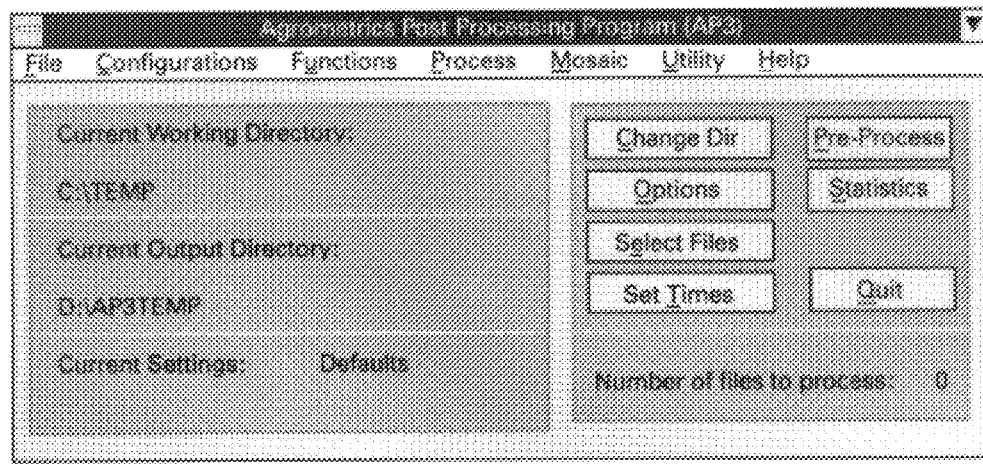
FIG. 4 depicts the main windows screen of the AP3 software of the present invention.

FIG. 4 depicts the main windows screen of the AP3 software of the present invention.

Figure 5:
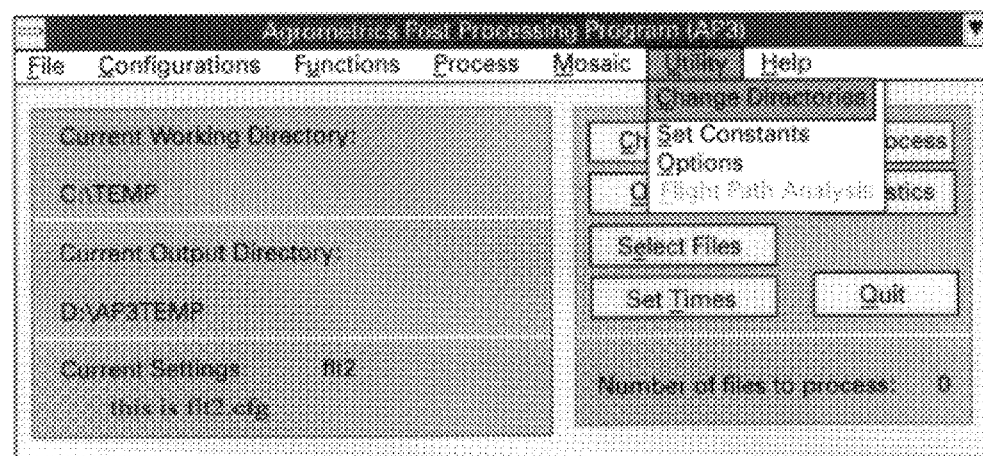
FIGS. 5 and 6 show the changing of directories from the main screen of the AP3 software.
Figure 6:
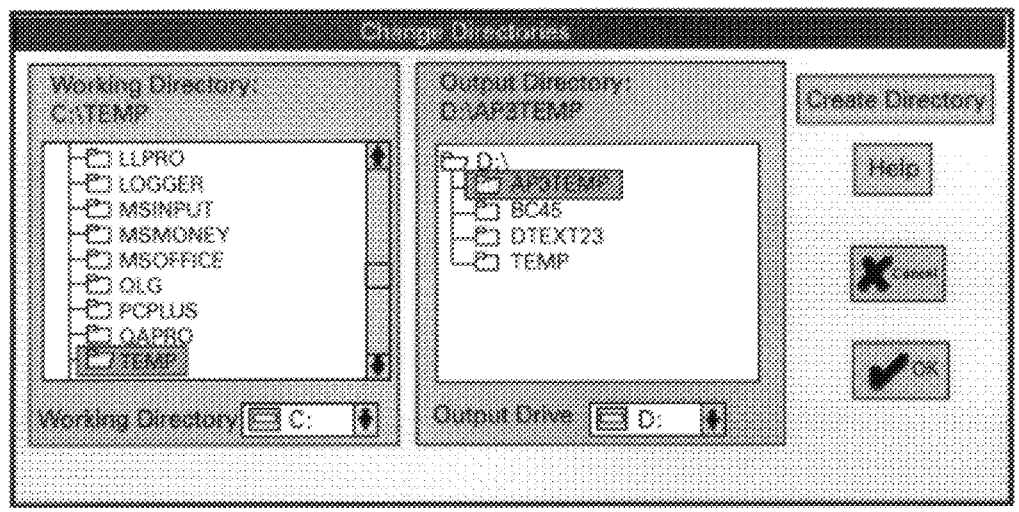

FIGS. 5 and 6 show the changing of directories from the main screen of the AP3 software. The working directories should be selected by the operator before beginning the Preprocessing operation in AP3.

Figure 7:
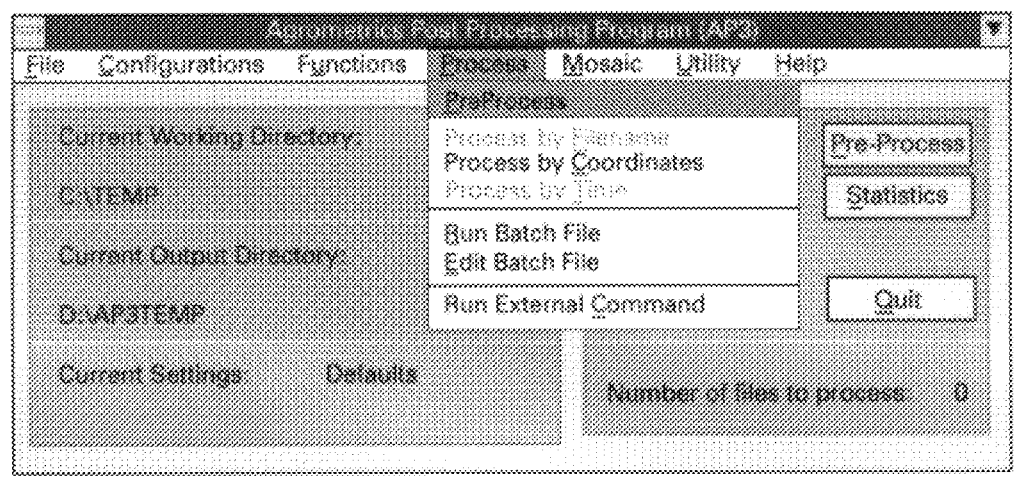
FIG. 7 depicts the selection of the Preprocessing menu of the AP3 software.

Preprocessing AP3:

FIG. 7 depicts the selection of the Preprocessing menu of the AP3 software. The preprocessor is located in the AP3 software.

Figure 8A:
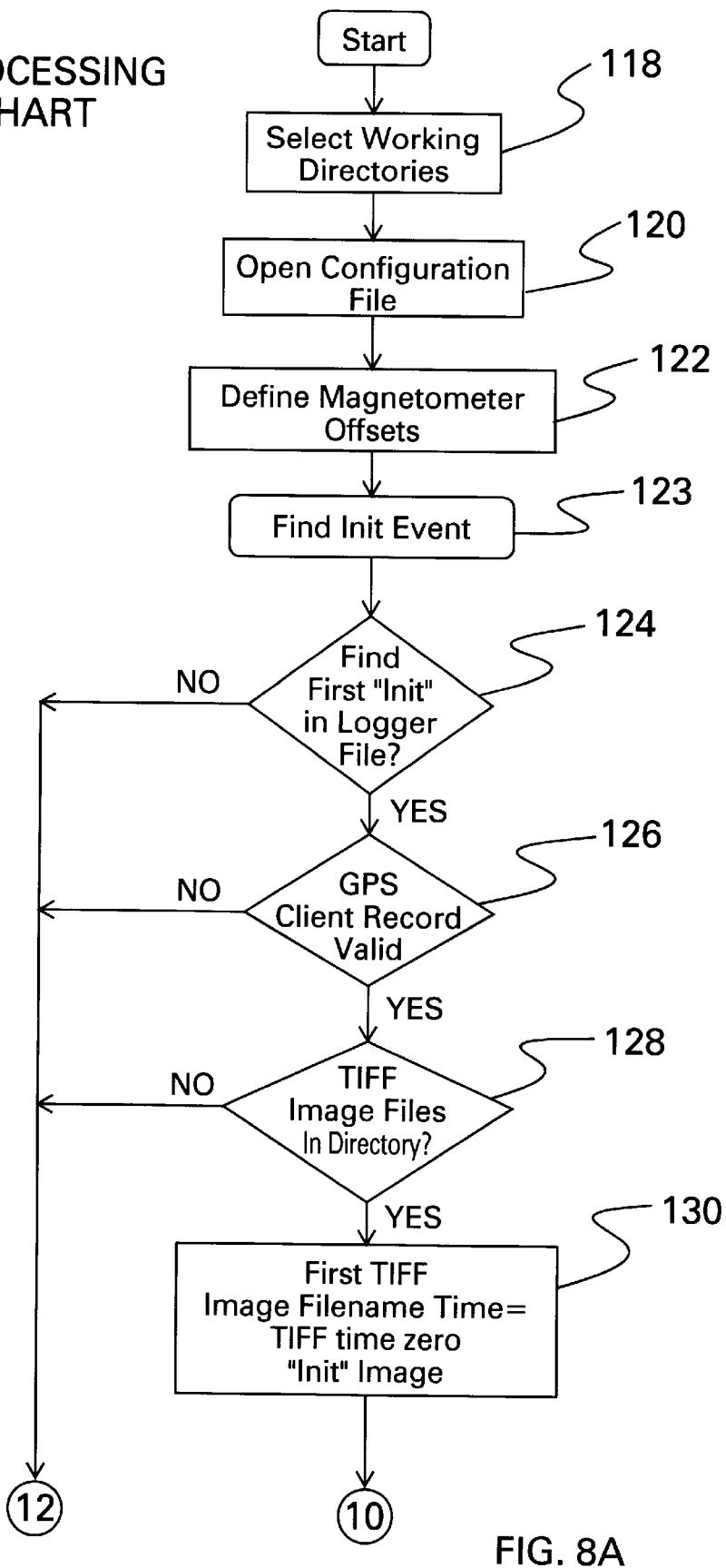
FIG. 8 is an illustrative flow diagram of the AP3 preprocessing software.
Figure 8B:
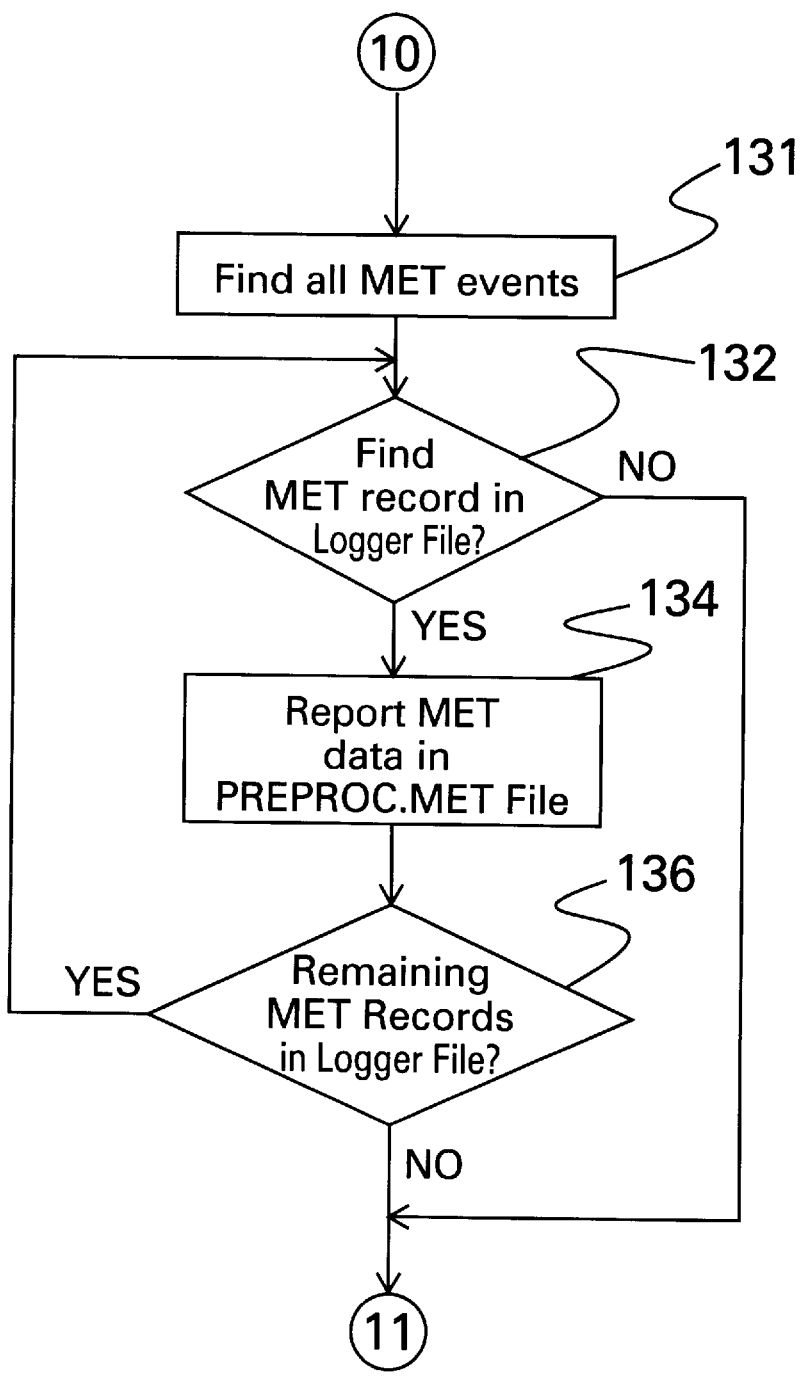
Figure 8C:
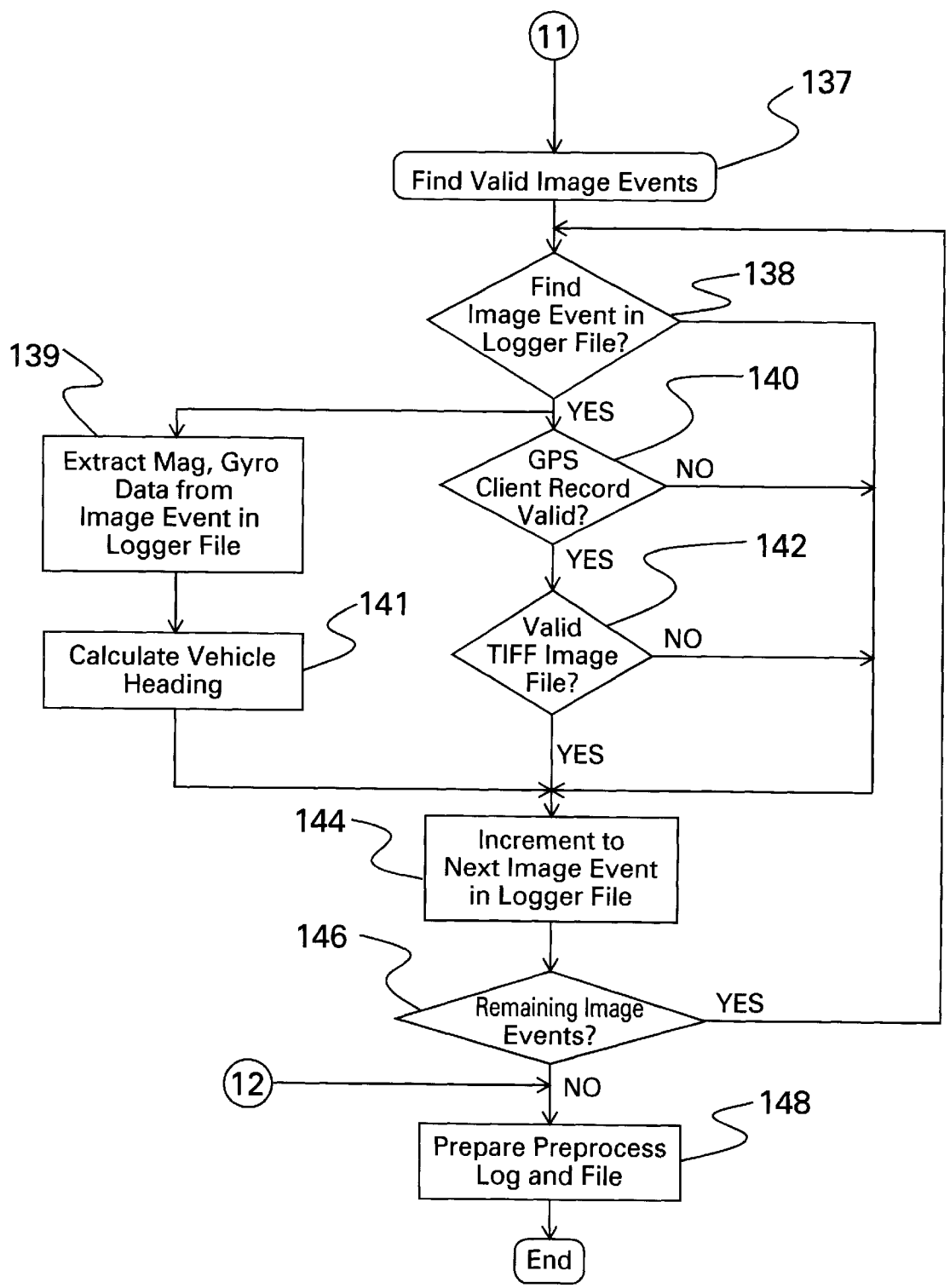

FIG. 8 is an illustrative flow diagram of the AP3 preprocessing software. The working directories consist of the input and output directories. All relevant input data is contained in the input directory. At step 118, a working directory is selected. The output mosaics will be written to the output directory. At step 120 a configuration file is created and saved. This file contains all necessary preprocessing and subsequent mosaicking parameters and constants.

Before preprocessing AP3, a Configuration file should be opened and saved. All constants and settings must be entered and saved in the configuration file. Configurations produced and saved previously can be loaded into AP3 provided that they are in the input directory. At step 122, the user enters magnetometer offsets (if desired) that remove the effects of any magnetic hard iron errors. These offsets are added to each magnetometer value (XY, and Z respectively) and are derived from a magnetic calibration procedure (not shown). The user then commences the Preprocessing activity in the AP3 software.

Figure 9:
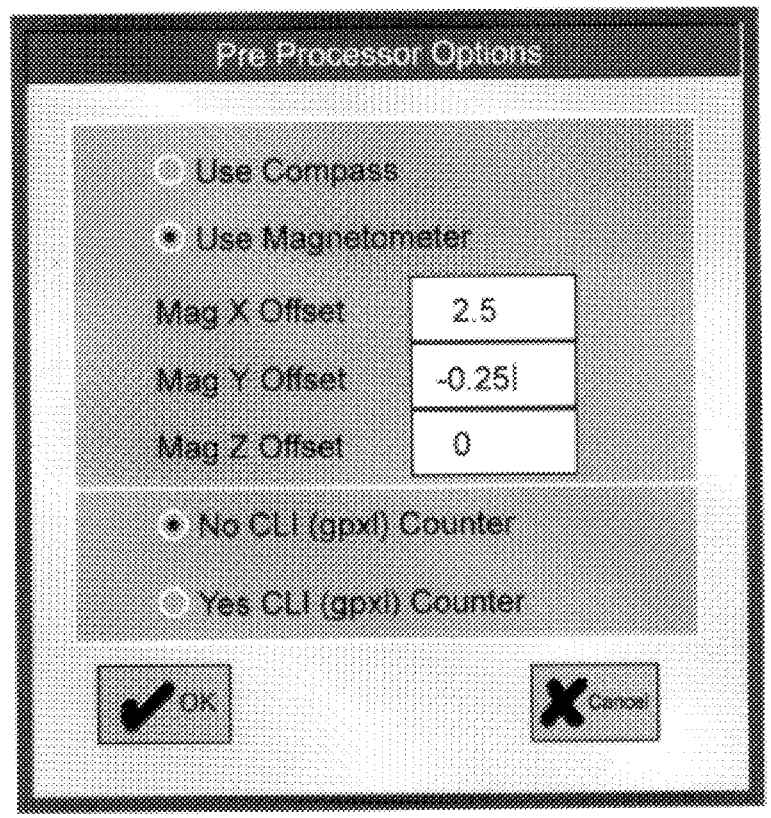
FIG. 9 depicts preprocessor options showing magnetometer offsets for the AP3 software.
Figure 10A:
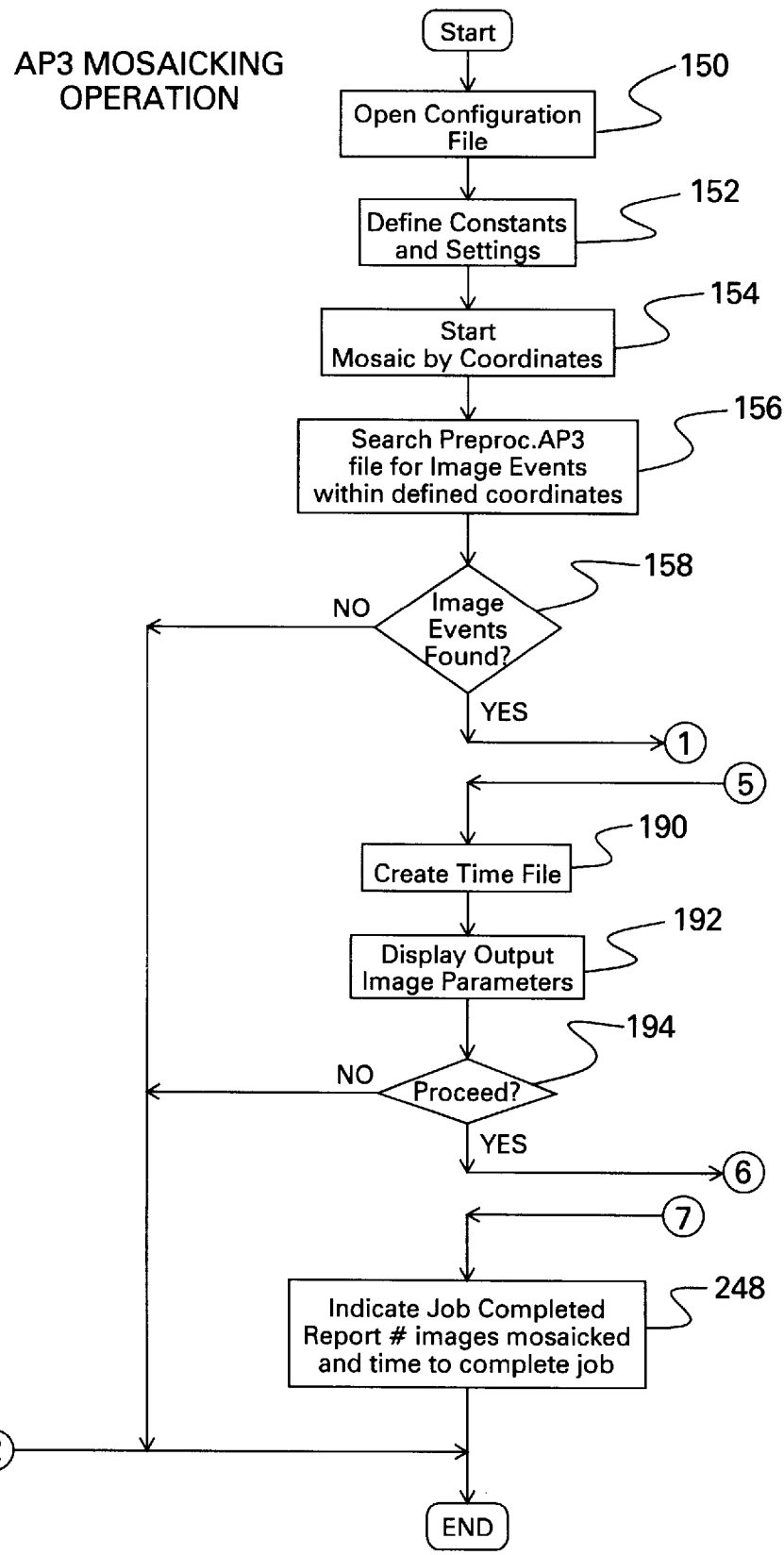
FIG. 10 is an illustrative flow diagram which depicts the mosaicking operation in accordance with the teachings of the present invention.
Figures 10B, 10C:
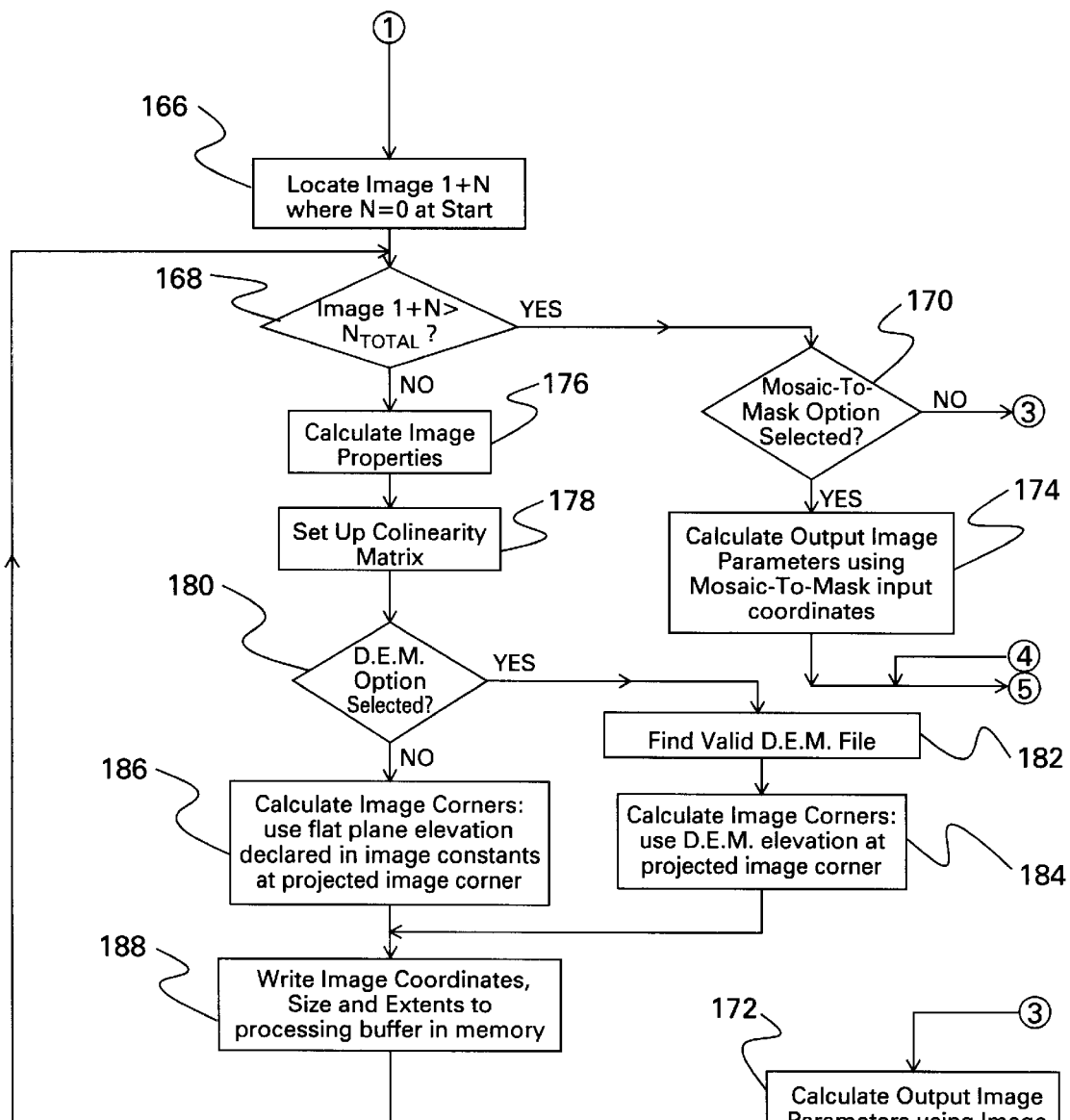
Figure 10D:
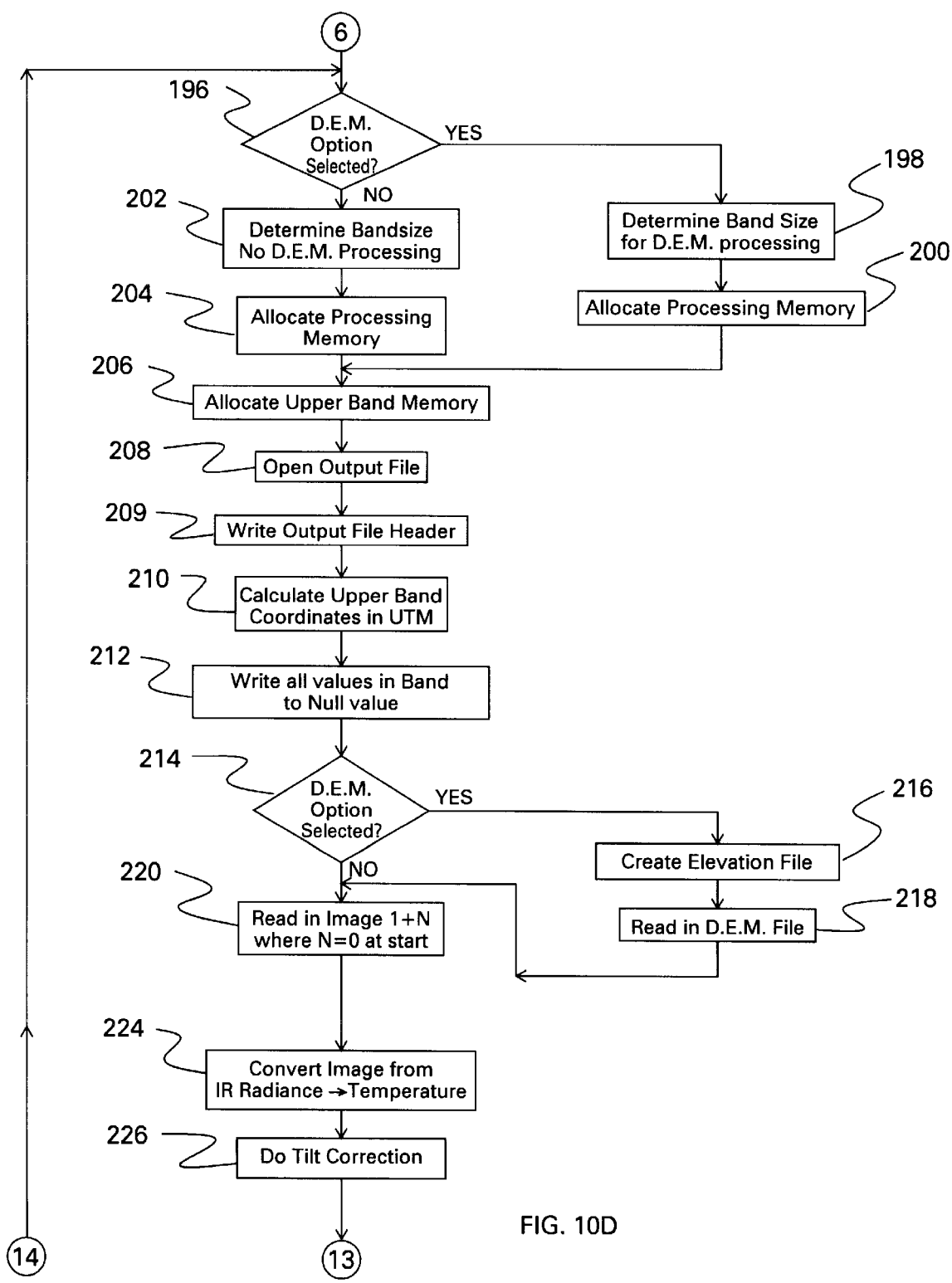
Figure 10E:
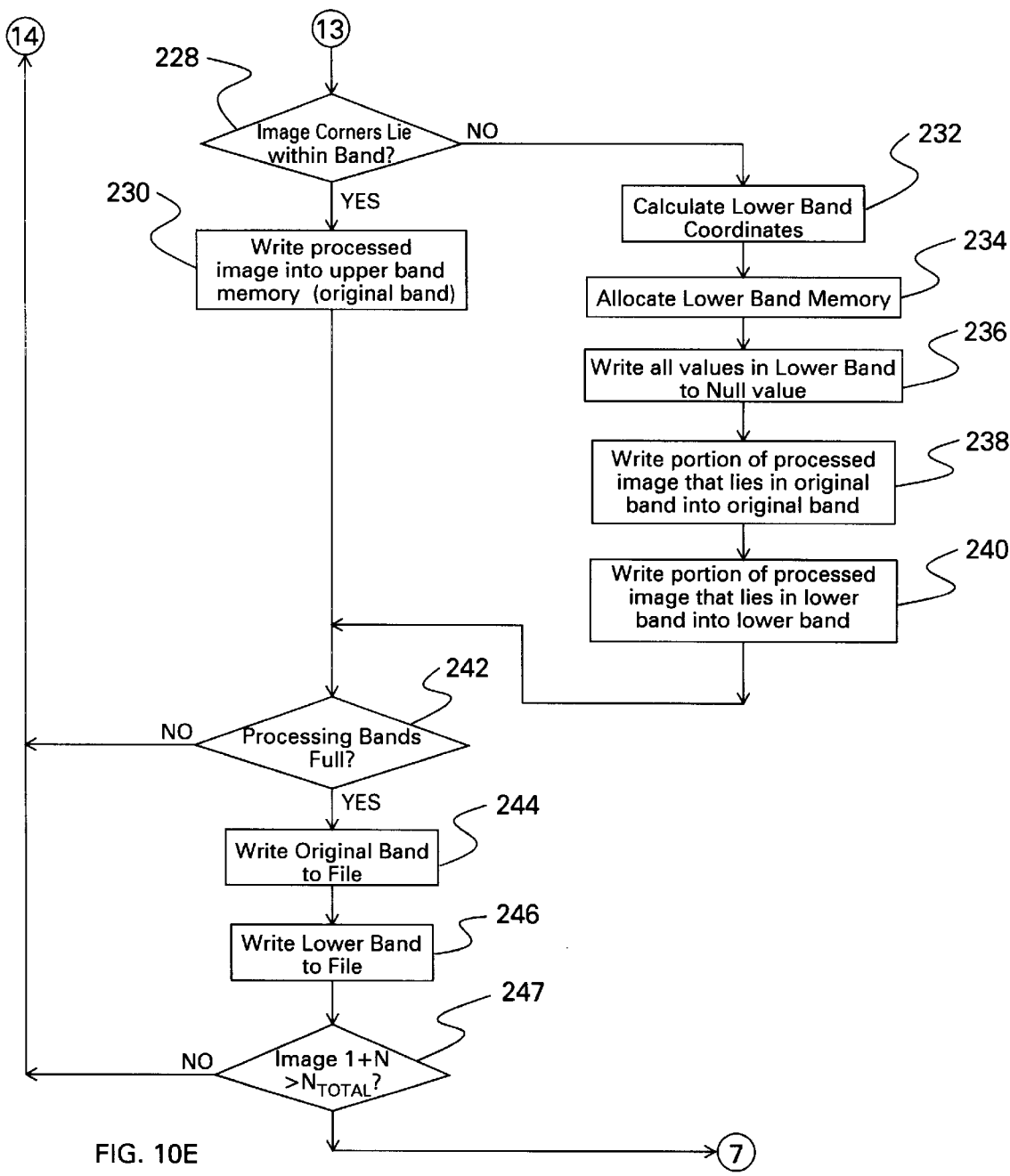

FIG. 9 depicts preprocessor options showing magnetometer offsets for the AP3 software.

AP3 uses a quality control method of GPS time vs. TIF file time to maintain a positive association with the thousands of image events that results from a typical survey flight. This permits a robustness that is necessary when a few image records among thousands are corrupt or missing.

Returning to FIG. 8, the following Quality Control (QC) method is employed:

1. Find the INIT "initialize" event (step 123). Scan *.MK5 file (logger file) for logger digital input status word for the first INIT event (step 124). The digital input status word is field 13 in the illustrative data logger record above. The word will indicate "251" for an INIT event. An INIT event is performed at the beginning of each survey flight. When the INIT button is pushed, the Timing and Logic Unit 18 sets the digital input word to "251" in the datalogger record. A corresponding GPS client event is also produced (step 126). It is also assumed that the earliest TIF image file time (step 130) encountered in the TIFF images (step 128) corresponds with the MK5 GPS time event (field 2) found in the same data logger record containing the INIT input. The TIF file time for the INIT event is known as TIF file time zero. Only one INIT is allowed for each processing session.

2. Determine if GPS Client record is valid (step 126). Scan *.CLI positioning file for CLI GPS time <MK5 GPS time. The CLI GPS time must also be no less than MK5 GPS time—0.3 seconds. The valid CLI GPS time found contains the UTM northing, UTM easting, and height of the aircraft GPS antenna for the strobe event. The MK5 and CLI records are triggered at the same time by the image strobe event from the Timing and Logic Unit. However, the MK5 record will always appear about 0.25 seconds after the strobe event because of the time the datalogger needs to sample the sensors and format the output record.

3. Find all MET "meteorological" events (step 131). Repeat steps 1 and 2 above and (step 132) look for digital input "253" in the *.MK5 record, then find corresponding valid *.CLI time and extract GPS time, UTM northing, UTM easting, UTM height. Add this *.CLI data to Temperature and Humidity found in *.MK5 and (step 134) write it to a file known as PREPROC.MET. Each "253" event encountered in the flight session has its data written as a new line in the PREPROC.MET file. Continue to scan for all MET records in the Datalogger file (step 136).

4. Find all valid image events for the survey session (step 137). Repeat steps 1 and 2 above and look (step 138) for digital input word "249" in the *.MK5 record, then (step 140) find the valid *.CLI record as depicted in 2 above. If found, then find the corresponding valid TIFF Image file (step 142) as depicted in 1 above. Continue (step 144) to search for all image events and form valid associations until all are accounted for (step 146). Extract all necessary data from the *.MK5 and *.CLI records and write it to the PREPROC.AP3 file (step 148). Each valid image event will occupy one full record in the PREPROC.AP3 file. This is a binary file. All relevant data contained in the various AP3 input files are combined into a single file called PREPROC.AP3. For each image event this file contains:

1. GPS time
2. UTMNorthing of aircraft GPS antenna
3. UTM Easting of aircraft GPS antenna
4. Geoid height of the aircraft GPS antenna (altitude)
5. Gyro pitch
6. Gyro roll
7. Imager 12 pitch (not shown)
8. Imager 12 roll (not shown)
9. Heading (derived from magnetometer 24 or compass (not shown))
10. Corresponding TIF image file from DIR 16 associated with the image event.

Heading is computed by extracting the magnetometer X, Y, and Z values from the datalogger record (step 139), applying the offsets entered in the preprocessing window in AP3 (see FIG. 6) to the magnetometer values, and combining Gyro Pitch and Gyro Roll and calculating heading (step 141). The algorithm that is used determines the attitude of the magnetometer (pitch, roll) and then calculates heading based upon the magnetometer values. The vector G which is true vertical is determined, and then the directional vector N which is magnetic north is calculated. The vector H which is vehicle heading relative to directional vector N is determined and entered as heading into the PREPROC.AP3 record (step 148).

Run AP3

FIG. 10 is an illustrative flow diagram which depicts the mosaicking operation in accordance with the teachings of the present invention. As shown in FIG. 10, when the configuration file (step 150) is opened and saved and all of the constants and settings have been defined (step 152), AP3 can be executed. This initiates the mosaicking process (step 154). Select "Mosaic" in the main menu and select "Mosaic by Coordinates". This will bring up a window with the same coordinates as those specified in the Select by Coordinates window (step 156). AP3 will search all valid image events produced during the preprocessing operation in the PREPROC.AP3 file. All image events located within the defined coordinates will be tagged (step 158). If none are found, processing will terminate. AP3 processes the images horizontally from left to right, working from top to bottom inside of the defined coordinates. Therefore, the first image is located in the upper left hand corner (step 166). All images within the coordinate window will be processed (step 168). AP3 first calculates the image properties of each image (step 176), principally the size and extents (number of rows, number of columns based upon horizontal and vertical fields of view, and cell size of the input image). Then, a colinearity matrix (3×3 rotational matrix) is constructed (step 178) which requires pitch, roll, and heading angles, vertical and horizontal fields of view, from the image event plus any angular biases from the configuration file. At this point, AP3 checks to see if a Digital Elevation Map (DEM) is to be used (step 180). If so, the DEM that encompasses the selected coordinates is located (step 182). Then, the program calculates each of the image's four corner coordinates in UTM northing and easting (the middle of the pixel). This is done by projecting the field of view of the imager after performing the axial rotations onto either a flat ground surface (step 186) or a surface defined by the DEM (step 184). The order of rotational translation is first azimuth or heading (clockwise positive), then pitch (nose-up positive), then roll (left wing up positive). The desired azimuth is usually North (0 degrees) giving an output coordinate system of North-West-Up. Any desired azimuth can be specified, which causes all of the images to be resampled to the azimuth. In the topographical ground elevation case (input Digital Elevation Map specified) an iterative method is used to find the actual corners. A ground altitude is assumed and a ground position based on that altitude is found. The altitude at that ground position is interpolated from the D.E.M. topographical files. This altitude is used in the next iteration. The process is continued until the ground altitude assumed equals the topographical solution within a tolerance. After performing this operation, the calculated coordinates, and the size and extent of the image are written into memory buffer (step 188). The estimated number of processing bands is also calculated and written into memory buffer. This process is repeated for all image events within the defined coordinate area (step 168). At this point, the software checks to see if the Mosaic to Mask option was chosen (step 170) (specified in configuration file (step 152)). The Mosaic to Mask defines specific output image coordinates (step 174), that literally create a "mask" which will produce straight edges along the borders, regardless of the input image coordinates. If this option is not chosen, then a rectangular border will be calculated (step 172) which encompasses all of the input images. Steps 172 and 174 provide Output Image Parameters. These output parameters consist of the number of rows, columns, and bands, the output coordinates, and the predicted output file size in bytes. A screen is displayed to the user indicating this information (step 192). An output file is also created (step 190) which contains all the input image TIFF file names, GPS time in seconds, and image center coordinates in UTM for the valid image set defined by the search coordinates step (156). This file is given the same name as the configuration filename with a TIM file suffix. After he Output Image Parameters window is displayed (step 192), the user is prompted to proceed (step 194). The mosaicking process is executed after the user agrees to proceed.

Upon executing, the software checks to see if the DEM option was specified (step 196). If a DEM was selected, the program calculates the maximum band size (step 198) (discussed later in more detail) for the output image and the reference DEM which will be produced. Fifty percent of the available memory will be used for the output image, and fifty percent will be used for the companion DEM image that will be produced (step 216). Then, the processing memory for banding is allocated (step 200). The companion DEM is a file that contains the reference DEM elevation file data that encompasses the exact area of the desired output mosaicked image. This DEM output file will have the same size and extent of the output image. It is constructed so that accurate elevation data (interpolated or non-interpolated) is available for each output image pixel during the mosaicking process.

If no DEM was specified, the program will allocate all available memory for processing (steps 202, 204). Approximately seventy-five percent of available banding memory is allocated to the upper band. This is the main processing band. The program utilizes a horizontal banding process which produces the output image in horizontal strips. Each strip or band is precisely mapped by a UTM coordinate system (step 210). The coordinates define the four corners of the band and indicate its exact location when written to output file (step 208) after the band is full (step 242). The output file usually located on a computer hard disk drive. The file is opened on the hard drive as a Generic Georeference Raster file (GGR) (step 208). A header is written to the file (step 209) which describes all of the necessary data-types and georeferencing parameters necessary for importing a GGR file into the Map and Image Processing Software (MIPS). Then, all pixel values in the upper band are written as null values (step 212). This is the background or null value that is used in the image. The null value is defined in configuration file (step 152). The program then checks to see if the DEM option was specified (step 214). If true, then the program creates a companion DEM file (step 216) and writes null values to all pixel locations. Following this, the program reads in reference DEM file (step 182) and linearly interpolates (if selected in configuration file) the DEM data to the proper pixel location into companion DEM file (step 216). Steps 216 and 218 are repeated for each band that is produced.

Now that the upper band is produced, and the output file is opened, the first image is selected (step 220) based upon the search coordinates (step 156) and the constructed input image parameters in memory buffer (step 188). The TIFF image data (step 220) is read in from the input directory specified in the working directories. The raw TIFF Infrared radiance values are converted to 16 bit signed absolute temperatures (step 224) and written to the temporary input image processing buffer, contained in the total processing memory (step 204 or step 200). Then, the tilt correction for the converted image is performed (step 226) by writing the tilt corrected image to the pixel locations specified in memory buffer (step 188) into the correct location (step 230) in the upper band. However, a check is performed (step 228) to make sure that all of the pixels lie within the upper band. If a portion of the input image lies outside the upper band (outliers will always lie below the upper band because processing takes place from top to bottom), then a lower band is produced. The portion of the image that lies in the upper band is written into the upper band (step 238). The outlying portion of the tilt corrected image is written to the lower band (step 240). The lower band is created in a similar manner to the upper band. The lower band's coordinates are calculated (step 232). The coordinates of the lower band depends upon the width of the upper band and the available memory remaining for the lower band. The lower band is allocated approximately twenty-five percent of the total band memory (step 234). Then, null values are written to the lower band (step 236). The upper and lower banding method that the software utilizes is a very efficient way of processing large amounts of input images into a single output image. All of the images need to be processed only one time.

After all of the input images assigned to the upper and lower band are considered (step 242) (memory buffer indicates which images are written to a specific band), then the bands are written to the output file (steps 244 and 246). If the bands are not full, then the next input image is selected (step 220) and processed. This process is repeated until all of the input images have been processed into a band and all bands written to the output file (step 247). The program displays a report screen after the images are mosaicked (step 248) and the process ends.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An aircraft based imaging system comprising:

a sensor mounted in said aircraft in a known orientation;

means for acquiring signals generated by said sensor from a scanned area and generating images in response thereto;

means for georeferencing said acquired signals;

means for compensating said images for tilt in said acquired signals and post processing software for creating a mosaic of images generated by said sensor, said post processing software utilizing a double banding technique that processes input tilt-corrected images into the mosaic of images.

2. An aircraft based infrared imaging system comprising:

an infrared sensor mounted in said aircraft in a known orientation;

means for acquiring and storing signals generated by said sensor from a scanned area and generating images in response thereto;

a global positioning receiver for georeferencing said acquired signals;

means for compensating said images for tilt in said acquired signals, said means for compensating for tilt in said acquired signals including a gyroscope, a magnetometer, means for controlling said gyroscope to produce signals indicative of the orientation of the aircraft; and post processing software for creating a mosaic of images generated by said sensor, said post processing software utilizing a double banding technique that processes input tilt-corrected images into the mosaic of images.

3. An aircraft based imaging system comprising:

a sensor mounted in said aircraft in a known orientation;

means for acquiring signals generated by said sensor from a scanned area;

means for georeferencing said acquired signals; and post processing software for creating a mosaic of images from said means for georeferencing said acquired signals, said post processing software utilizing a double banding technique that processes input tilt-corrected images into the mosaic of images.

4. An aircraft based imaging system comprising:

a sensor mounted in said aircraft in a known orientation;

means for acquiring signals generated by said sensor from a scanned area, means for georeferencing said acquired signals;

means for compensating for tilt in said acquired signals; and post processing software for creating a mosaic of images generated by said sensor, said post processing software utilizing a double banding technique that processes input tilt-corrected images into the mosaic of images.

5. An aircraft based infrared imaging system comprising:

an infrared sensor mounted in said aircraft in a known orientation;

means for acquiring and storing signals generated by said sensor from a scanned area;

a global positioning receiver for georeferencing said acquired signals; and post processing software for creating a mosaic of images generated by said sensor, said post processing software utilizing a double banding technique that processes input tilt-corrected images into the mosaic of images.

6. An aircraft based infrared imaging system comprising:

an infrared sensor mounted in said aircraft in a known orientation;

means for acquiring and storing signals generated by said sensor from a scanned area;

a global positioning receiver for georeferencing said acquired signals;

means for compensating for tilt in said acquired signals, said means for compensating for tilt in said acquired signals including a gyroscope, a magnetometer, means for controlling said gyroscope to produce signals indicative of the orientation of the aircraft; and post processing software for creating a mosaic of images generated by said sensor, said post processing software utilizing a double banding technique that processes input tilt-corrected images into the mosaic of images.

* * * * *